(12) United States Patent
Huang

(10) Patent No.: US 12,081,971 B2
(45) Date of Patent: Sep. 3, 2024

(54) KEY INFORMATION SYNCHRONIZATION METHOD AND SYSTEM, AND DEVICE

(71) Applicant: HUAWEI TECHNOLOGIES CO., LTD., Guangdong (CN)

(72) Inventor: Shaolin Huang, Xi'an (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 300 days.

(21) Appl. No.: 17/774,220

(22) PCT Filed: Nov. 27, 2020

(86) PCT No.: PCT/CN2020/132212
§ 371 (c)(1),
(2) Date: May 4, 2022

(87) PCT Pub. No.: WO2021/104448
PCT Pub. Date: Jun. 3, 2021

(65) Prior Publication Data
US 2022/0408247 A1    Dec. 22, 2022

(30) Foreign Application Priority Data
Nov. 30, 2019  (CN) .......................... 201911208835.5

(51) Int. Cl.
*H04W 12/04*         (2021.01)
*H04W 12/041*        (2021.01)
(Continued)

(52) U.S. Cl.
CPC ..... *H04W 12/0431* (2021.01); *H04W 12/041* (2021.01); *H04W 12/0433* (2021.01); *H04W 12/06* (2013.01)

(58) Field of Classification Search
None
See application file for complete search history.

(56) References Cited

U.S. PATENT DOCUMENTS

| 11,284,258 B1* | 3/2022 | Wei ......................... H04L 63/10 |
| 2015/0229475 A1* | 8/2015 | Benoit ................ H04W 12/069 |
| | | 713/168 |

(Continued)

FOREIGN PATENT DOCUMENTS

| CN | 104010352 A | 8/2014 |
| CN | 105763517 A | 7/2016 |

(Continued)

*Primary Examiner* — David J Pearson
(74) *Attorney, Agent, or Firm* — WOMBLE BOND DICKINSON (US) LLP

(57) ABSTRACT

This application provides a key information synchronization method and system, and a device, and relates to the field of communications technologies. The method includes: A terminal sends a first public key of the terminal to an IoT device; the terminal obtains a second public key of the IoT device from the IoT device; the terminal sends first key information to a hub device, where the first key information includes a first private key of the terminal, the first public key, and the second public key; the hub device uses the first private key and the first public key in the first key information as a key pair of the hub device; and the hub device performs encrypted interaction with the IoT device by using the first key information.

26 Claims, 12 Drawing Sheets

(51) Int. Cl.
*H04W 12/0431* (2021.01)
*H04W 12/0433* (2021.01)
*H04W 12/06* (2021.01)

(56) References Cited

U.S. PATENT DOCUMENTS

| | | | |
|---|---|---|---|
| 2017/0005820 A1* | 1/2017 | Zimmerman | ............ H04L 67/10 |
| 2018/0109381 A1* | 4/2018 | Cammarota | ........ H04W 12/041 |
| 2018/0109418 A1* | 4/2018 | Cammarota | .......... H04W 12/50 |
| 2019/0253243 A1 | 8/2019 | Zimmerman et al. | |
| 2019/0332774 A1* | 10/2019 | Nix | ....................... H04W 12/50 |
| 2020/0221296 A1* | 7/2020 | Jiang | ................... H04L 63/0869 |
| 2020/0314074 A1* | 10/2020 | Mondello | ............. H04L 9/0819 |

FOREIGN PATENT DOCUMENTS

| | | |
|---|---|---|
| CN | 106249608 A | 12/2016 |
| CN | 106888206 A | 6/2017 |
| CN | 107947933 A | 4/2018 |
| CN | 107948178 A | 4/2018 |
| CN | 107979465 A | 5/2018 |
| CN | 109863770 A | 6/2019 |
| CN | 110071901 A | 7/2019 |
| KR | 20170130904 A | 11/2017 |
| WO | 2018075135 A1 | 4/2018 |

* cited by examiner

KEY INFORMATION SYNCHRONIZATION METHOD AND SYSTEM, AND DEVICE

CROSS-REFERENCE TO RELATED APPLICATIONS

This application is a national stage of International Application No. PCT/CN2020/132212, filed on Nov. 27, 2020, which claims priority to Chinese Patent Application No. 201911208835.5, filed on Nov. 30, 2019. Both of the aforementioned applications are hereby incorporated by reference in their entireties.

TECHNICAL FIELD

This application relates to the field of communications technologies, and in particular, to a key information synchronization method and system, and a device.

BACKGROUND

With development of smart home technologies, a user or a home usually has a plurality of IoT (internet of things) devices, for example, a smart speaker, a smart lamp, or a smart curtain. The user can use a related app on a mobile phone to manage all of these IoT devices through a cloud server. Alternatively, the user may locally set a hub device (for example, a router or a smart television) to manage all of these IoT devices.

When the user uses the mobile phone to manage the IoT device, the user may operate a screen of the mobile phone, to obtain device information (for example, a personal identification number or PIN code) of the IoT device in a manner such as scanning a QR (quick response) code. Further, the mobile phone may negotiate, based on the device information of the IoT device, with the IoT device for encryption information (for example, a public key and a private key) used in subsequent interaction. Subsequently, when sending a control instruction to the IoT device, the mobile phone may perform encryption by using the negotiated encryption information, to ensure security when the mobile phone controls the IoT device.

However, when the user uses a hub device (for example, a router) without a screen to manage the IoT device, because such a hub device has no screen, the user cannot obtain the device information of the IoT device through scanning by using a screen of the hub device. Therefore, such a hub device cannot negotiate with the IoT device for encryption information used in subsequent interaction. In this case, an unencrypted plaintext is usually used when such a hub device sends a control instruction to the IoT device. As a result, after receiving the control instruction, the IoT device cannot effectively verify an identity of a transmit end, and the control instruction sent by the hub device is easy to steal by another person. Therefore, a security risk and a risk of user privacy leakage during control over the IoT device are increased.

SUMMARY

This application provides a key information synchronization method and system, and a device. When a hub device manages an IoT device, a security risk and a risk of user privacy leakage during interaction between the hub device and the IoT device can be reduced.

To achieve the foregoing objectives, the following technical solutions are used in this application.

According to a first aspect, an embodiment of this application provides a key information synchronization method, including: A terminal and an IoT device exchange a public key of each other, to be specific, the terminal sends a public key (e.g., a first public key) of the terminal to the IoT device, and obtains a public key (e.g., a second public key) of the IoT device from the IoT device; and the terminal may synchronize a key pair (that is, the first public key and a first private key) of the terminal and the second public key to a hub device as first key information, and the hub device sets the first private key and the first public key in the first key information as a key pair of the hub device. In this way, the hub device and the terminal have a same key pair, and both the hub device and the terminal have the public key (e.g., the second public key) of the IoT device.

In this way, when the hub device sends a first message to the IoT device, the hub device may generate and/or sign a digital signature on the to-be-sent first message by using the first private key, and send the signed first message to the IoT device. The IoT device may perform identity authentication on the signed first message by using the first public key synchronized from the terminal. Similarly, when the IoT device sends a second message to the hub device, the IoT device may generate and/or a digital signature on a to-be-sent second message by using a private key (e.g., a second private key) of the IoT device, and send the signed second message to the hub device. The hub device performs identity authentication on the signed second message by using the second public key synchronized from the terminal. In other words, when the hub device interacts with the IoT device, the hub device may use the key information of the terminal as key information of the hub device, so as to improve security in a process of the interaction between the hub device and the IoT device, and reduce a risk of user privacy leakage.

Similarly, when the terminal sends a third message to the hub device, the terminal may generate and/or sign a digital signature on the third message by using the first private key, and send the signed third message to the hub device. The hub device may perform identity authentication on the signed third message by using the public key (e.g., the first public key) of the hub device. When the hub device sends a fourth message to the terminal, the hub device may also generate and/or sign a digital signature on the fourth message by using the first private key, and send the signed fourth message to the terminal. The terminal may perform identity authentication on the signed fourth message by using the public key (e.g., the first public key) of the terminal. In other words, when the hub device interacts with the terminal, the hub device may also use the key information of the terminal as the key information of the hub device, so as to improve security in a process of the interaction between the hub device and the terminal, and reduce a risk of user privacy leakage.

In an embodiment, before that a terminal sends a first public key of the terminal to an internet of things IoT device, the method further includes: The terminal obtains first device information of the IoT device, where the first device information may include a PIN code of the IoT device; and the terminal negotiates a first shared key with the IoT device based on the first device information. In this case, when sending a first public key of the terminal to an IoT device, the terminal encrypts the first public key by using the first shared key, and sends the encrypted first public key to the IoT device, so as to avoid leakage when the terminal and the IoT device exchange the public keys of each other.

In an embodiment, before sending the first key information to a hub device, the terminal obtains second device information of the hub device, where the second device information may include a PIN code of the hub device; and the terminal negotiates a second shared key with the hub device based on the second device information. When sending first key information to a hub device, the terminal encrypts the first key information by using the second shared key, and sends the encrypted first key information to the IoT device, so as to avoid leakage of the first key information.

According to a second aspect, an embodiment of this application provides a key information synchronization system. The system includes a hub device, a terminal, and an IoT device. A key pair of the terminal includes a first private key and a first public key, and a key pair of the IoT device includes a second private key and a second public key.

The IoT device is configured to obtain the first public key from the terminal. The terminal is configured to: obtain the second public key from the IoT device; and send first key information to the hub device, where the first key information includes the first private key, the first public key, and the second public key. The hub device is configured to: receive the first key information sent by the terminal, use the first private key and the first public key in the first key information as a key pair of the hub device, and perform encrypted interaction with the IoT device by using the first key information.

In other words, after the terminal and the IoT device exchange the public keys of each other, the terminal may synchronize the key information obtained in this case to the hub device, so that when the hub device subsequently interacts with the IoT device, the hub device may use the key information of the terminal as the key information of the hub device to perform encrypted interaction with the IoT device, so as to improve security of interaction between the hub device and the IoT device, and reduce a risk of user privacy leakage.

In a possible implementation, when the hub device sends a message to the IoT device, the hub device is further configured to: generate and/or sign a digital signature on a first message by using the first private key, and send the signed first message to the IoT device; and the IoT device is further configured to: receive the signed first message sent by the hub device, and perform identity authentication on the first message by using the first public key.

In an embodiment, when the IoT device sends a message to the hub device, the IoT device is further configured to: generate and/or sign a digital signature on a second message by using the second private key, and send the signed second message to the hub device; and the hub device is further configured to: receive the signed second message sent by the IoT device, and perform identity authentication on the second message by using the second public key.

In an embodiment, when the terminal sends a message to the hub device, the terminal is further configured to: generate and/or sign a digital signature on a third message by using the first private key, and send the signed third message to the hub device; and the hub device is further configured to: receive the signed third message sent by the terminal, and perform identity authentication on the signed third message by using the first public key.

In an embodiment, the terminal is further configured to: obtain first device information of the IoT device, where the first device information includes a PIN code of the IoT device; negotiate a first shared key with the IoT device based on the first device information; and encrypt the first public key by using the first shared key, and send the encrypted first public key to the IoT device; and the IoT device is further configured to: encrypt the second public key by using the first shared key, and send the encrypted second public key to the terminal. In other words, the terminal and the IoT device may negotiate the first shared key, encrypt the public keys (e.g., the first public key and the second public key) of each other by using the first shared key, and then send the encrypted public keys to each other, so as to avoid leakage of the public keys of the terminal and the IoT device.

In an embodiment, the terminal is further configured to obtain second device information of the hub device, where the second device information includes a PIN code of the hub device; and negotiate a second shared key with the hub device based on the second device information. In this case, when sending the first key information to the hub device, the terminal may encrypt the first key information by using the second shared key, and send the encrypted first key information to the hub device.

For example, the terminal may perform SPEKE negotiation with the IoT device, to obtain the first shared key. Alternatively, the terminal may perform SPEKE negotiation with the hub device, to obtain the second shared key.

For example, the terminal may obtain the first device information of the IoT device by scanning a QR code on the IoT device, or obtain the second device information of the hub device by scanning a QR code on the hub device.

In an embodiment, the terminal is further configured to send a management policy of the IoT device to the hub device, where the management policy is used to indicate that the IoT device performs a first operation when a first trigger condition is met. The hub device is further configured to: receive the management policy of the IoT device that is sent by the terminal; and when the first trigger condition is met, the hub device sends, to the IoT device, a control instruction corresponding to the first operation, so as to implement a function of controlling the IoT device by the hub device.

In an embodiment, the terminal and the hub device are further configured to negotiate a third shared key by using the key pairs of each other. Further, the terminal may encrypt the management policy of the IoT device by using the third shared key and send the encrypted management policy to the hub device, and the hub device may decrypt, by using the third shared key, the management policy of the IoT device that is sent by the terminal.

In an embodiment, the hub device and the IoT device are further configured to negotiate a fourth shared key by using the key pairs of each other. Further, the hub device may encrypt, by using the fourth shared key, the control instruction corresponding to the first operation, and send the encrypted control instruction to the IoT device, and the IoT device may decrypt, by using the fourth shared key, the control instruction sent by the hub device, and execute the control instruction.

In an embodiment, the terminal is further configured to receive the management policy that is set by a user for the IoT device in a preset application. In other words, the user may manually set a corresponding management policy for each IoT device on the terminal.

In an embodiment, the hub device may be an electronic device that does not have a display function. For example, the hub device may be an electronic device that does not have a display, such as a router.

In an embodiment, the key information synchronization system may include a first-type device, a second-type device, and a third-type device. The first-type device may be configured to implement a related function of the terminal, the second-type device may be configured to implement a related function of the hub device, and the third-type device may be configured to implement related functions of the foregoing IoT device.

According to a third aspect, a terminal sends a first public key of the terminal to an IoT device; the terminal obtains a second public key of the IoT device from the IoT device; the terminal sends first key information to a hub device, where the first key information includes a first private key of the terminal, the first public key, and the second public key, so that the hub device performs encrypted interaction with the IoT device by using the first key information.

In an embodiment, before sending a first public key of the terminal to an IoT device, the terminal obtains first device information of the IoT device, where the first device information includes a PIN code of the IoT device; and the terminal negotiates a first shared key with the IoT device based on the first device information. In sending a first public key of the terminal to an IoT device, the terminal encrypts the first public key by using the first shared key, and sends the encrypted first public key to the IoT device.

In an embodiment, before sending first key information to a hub device, the terminal obtains second device information of the hub device, where the second device information includes a PIN code of the hub device; and the terminal negotiates a second shared key with the hub device based on the second device information. When sending first key information to a hub device, the terminal encrypts the first key information by using the second shared key, and sends the encrypted first key information to the IoT device.

In an embodiment, after sending first key information to a hub device, the terminal sends a management policy of the IoT device to the hub device, where the management policy is used to indicate that the IoT device performs a first operation when a first trigger condition is met.

In an embodiment, before sending a management policy of the IoT device to the hub device, the terminal negotiates a third shared key with the hub device by using the first key information. When sending a management policy of the IoT device to the hub device, the terminal encrypts the management policy of the IoT device by using the third shared key, and sends the encrypted management policy to the hub device.

According to a fourth aspect, a hub device receives first key information sent by a terminal, where the first key information includes a first private key of the terminal, a first public key of the terminal, and a second public key of an internet of things IoT device; the hub device determines that the first private key and the first public key are a key pair of the hub device; and the hub device performs encrypted interaction with the IoT device by using the first key information.

In addition, after determining the first private key and the first public key as the key pair of the hub device, the hub device may further perform encrypted interaction with the terminal by using the first private key and the first public key, so as to reduce a security risk during interaction between the hub device and the terminal.

In an embodiment, after that a hub device receives first key information sent by a terminal, the hub device obtains a management policy of the IoT device from the terminal, where the management policy is used to indicate that the IoT device performs a first operation when a first trigger condition is met; and when the first trigger condition is met, the hub device sends, to the IoT device, a control instruction corresponding to the first operation.

In an embodiment, when obtaining a management policy of the IoT device from the terminal, the hub device negotiates a third shared key with the terminal by using the first key information; the hub device obtains the encrypted management policy of the IoT device from the terminal; and the hub device decrypts the management policy of the IoT device by using the third shared key.

In an embodiment, when sending, to the IoT device, a control instruction corresponding to the hub device negotiates a fourth shared key with the IoT device by using the first key information; and the hub device encrypts, by using the fourth shared key, the control instruction corresponding to the first operation, and sends the encrypted control instruction to the IoT device.

According to a fifth aspect, this application provides a terminal, including a touchscreen, a communications module, one or more processors, one or more memories, and one or more computer programs. The processor is coupled to the touchscreen, the communications module, and the memory. The one or more computer programs are stored in the memory. When the terminal runs, the processor executes the one or more computer programs stored in the memory, so that the terminal performs any one of the foregoing key information synchronization methods.

According to a sixth aspect, this application provides a hub device, including a communications module, one or more processors, one or more memories, and one or more computer programs. The processor is coupled to both the communications module and the memory. The one or more computer programs are stored in the memory. When the hub device runs, the processor executes the one or more computer programs stored in the memory, so that the hub device performs any one of the foregoing key information synchronization methods.

According to a seventh aspect, this application provides a computer-readable storage medium, including computer instructions. When the computer instructions are run on the foregoing terminal, the terminal is enabled to perform any one of the key information synchronization methods. When the computer instructions are run on the foregoing hub device, the hub device is enabled to perform any one of the foregoing key information synchronization methods.

According to an eighth aspect, this application provides a computer program product. When the computer program product runs on the foregoing terminal, the terminal is enabled to perform any one of the key information synchronization methods. When the computer program product runs on the foregoing hub device, the hub device is enabled to perform any one of the foregoing key information synchronization methods.

It may be understood that the terminal, the computer-readable storage medium, and the computer program product provided in the foregoing aspects are all applied to the corresponding system provided above, and are configured to perform the corresponding method provided above. Therefore, for beneficial effects that can be achieved, refer to the beneficial effects in the corresponding system or method provided above. Details are not described herein again.

DESCRIPTION OF EMBODIMENTS

The following describes implementations of the embodiments in detail with reference to accompanying drawings.

Figure 1:
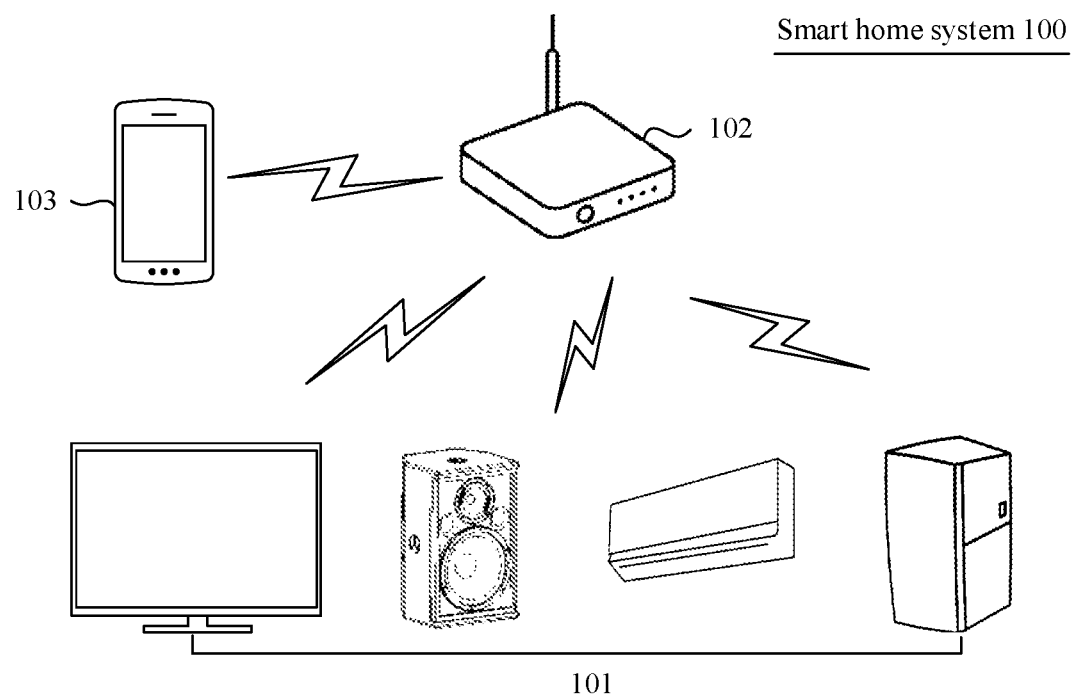
FIG. 1 is a schematic architectural diagram of a key information synchronization system according to an embodiment of this application.

A key information synchronization method provided in the embodiments of this application may be applied to a smart home system (which may also be referred to as a key information synchronization system). As shown in FIG. 1, the smart home system 100 may include one or more IoT (internet of things) devices 101. For example, the IoT device 101 may be a smart home device such as a smart television, a smart air conditioner, a smart refrigerator, a smart speaker, a camera, a smart light bulb, or a smart curtain.

For example, the IoT devices 101 may be interconnected through a communications network. The communications network may be a wired network, or may be a wireless network. For example, the communications network may be a local area network (LAN), or may be a wide area network (WAN), for example, the internet. The foregoing communications network may be implemented by using any known network communications protocol. The foregoing network communications protocol may be various wired or wireless communications protocols, such as the Ethernet, a universal serial bus (USB), a firewire, a global system for mobile communications (GSM), a general packet radio service (GPRS), code division multiple access (CDMA), wideband code division multiple access (WCDMA), time-division code division multiple access (TD-SCDMA), long term evolution (LTE), Bluetooth, wireless fidelity (Wi-Fi), NFC (near field communications), voice over internet protocol (VoIP), a communications protocol that supports a network slicing architecture, or any other suitable communications protocol.

For example, a Wi-Fi connection may be established between the IoT devices 101 through a Wi-Fi network. For another example, after logging in to a same account (for example, a Huawei account), the plurality of IoT devices 101 may be interconnected by using one or more servers.

Still as shown in FIG. 1, the smart home system 100 may further include a hub device 102. The hub device 102 may be configured to manage each IoT device 101 in the smart home system 100. For example, the hub device 102 may obtain a working status of each IoT device 101. For another example, the hub device 102 may send a corresponding control instruction to the IoT device 101, to control the IoT device 101 to implement a corresponding function.

For example, the hub device 102 may be an access point (AP), configured to provide a signal source of the Wi-Fi network for the IoT device 101. For example, the hub device 102 may be a router. The hub device 102 and the IoT device 101 are located in a same communications network.

Still as shown in FIG. 1, the smart home system 100 may further include a terminal 103. For example, the terminal 103 may be a mobile phone, a tablet computer, a notebook computer, or the like. For example, the mobile phone is the terminal 103. The mobile phone may also access the communications network in which the hub device 102 and the IoT device 101 are located. For example, the mobile phone may access the Wi-Fi network in which the hub device 102 and the IoT device 101 are located. A user may also use the mobile phone to manage each IoT device 101 in the smart home system 100.

For example, the user may install a smart home app on the mobile phone, and the smart home app may be used to manage the IoT devices 101 that log in to the same account. For example, the user uses the smart home app to turn on a smart air conditioner at home. After the user adds the IoT device 101, that is, the smart air conditioner, to the smart home app, the mobile phone may bind the smart air conditioner to the account used to log in to the smart home app. After the user opens the smart home app, if the smart air conditioner is connected to a home Wi-Fi network, the mobile phone may display the smart air conditioner as an online device in the smart home app. Further, the user may enter a power-on operation for the smart air conditioner in the smart home app, and the mobile phone may respond to the operation and send a power-on instruction to the smart air conditioner. After receiving the power-on instruction, the smart air conditioner may automatically perform the power-on operation. In this way, a function of controlling the IoT device 101 by the user by using the mobile phone is implemented.

Figure 2:
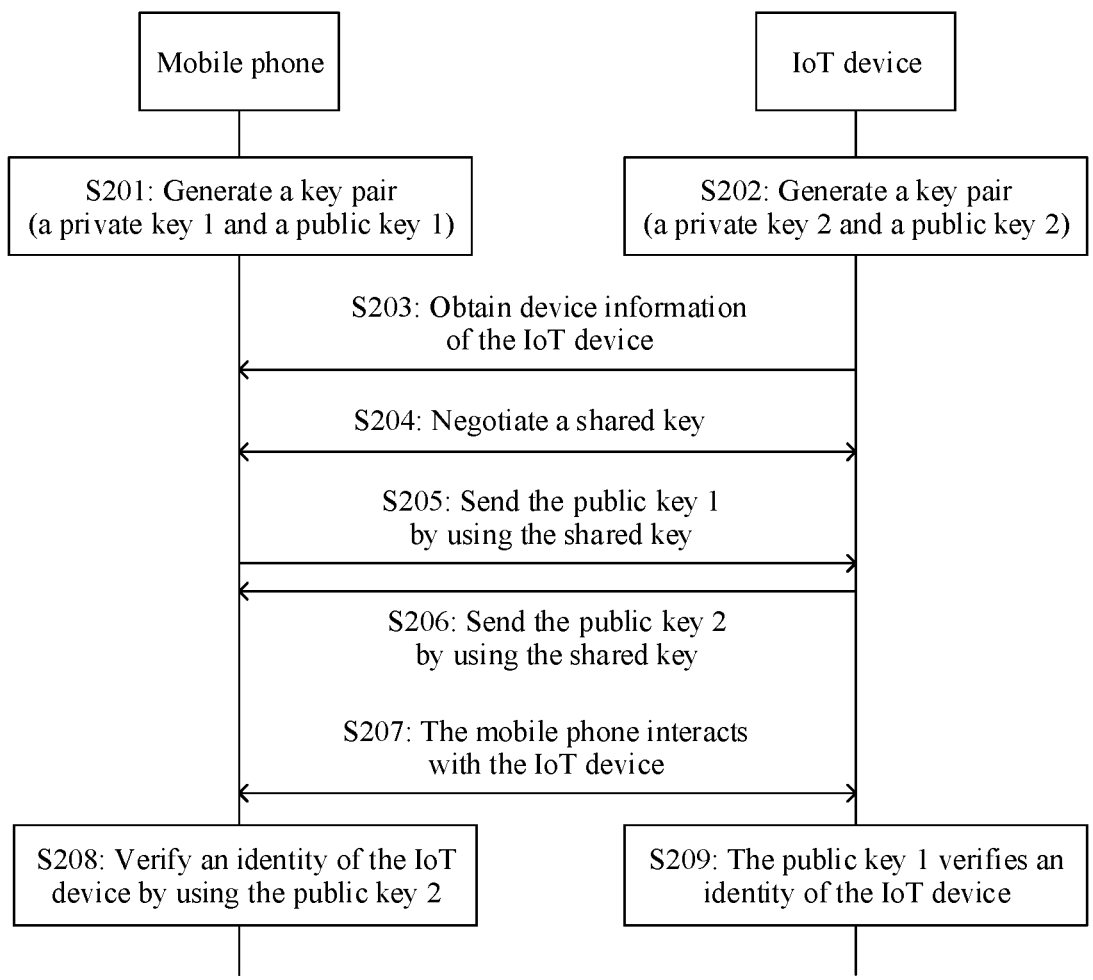
FIG. 2 is a schematic interaction diagram of a key information synchronization method according to an embodiment of this application.

To ensure security during interaction between the mobile phone and the IoT device 101, when the user adds the IoT device 101 to the smart home app of the mobile phone, the mobile phone may negotiate with the IoT device 101 for key information used for subsequent interaction. For example, as shown in FIG. 2, the mobile phone may pre-generate a key pair of the mobile phone, that is, S201. For example, the key pair of the mobile phone includes a private key 1 and a public key 1. Similarly, the IoT device 101 may also pre-generate a key pair of the IoT device 101, that is, S202. For example, the key pair of the IoT device 101 includes a private key 2 and a public key 2. After scanning a QR code on the IoT device 101, the mobile phone may obtain device information of the IoT device 101 from the QR code (that is, S203). For example, the device information of the IoT device 101 may include a name, a PIN code, and the like of the IoT device 101. Further, in S204, the mobile phone may negotiate, with the IoT device 101 based on the device information, a shared key used in current interaction. Further, in S205, the mobile phone may encrypt the public key 1 of the mobile phone by using the shared key, and transmit the encrypted public key 1 of the mobile phone to the IoT device 101. Similarly, in S206, the IoT device 101 may also encrypt the public key 2 of the IoT device 101 by using the shared key, and transmit the encrypted public key 2 of the IoT device 101 to the mobile phone. In other words, the mobile phone and the IoT device 101 can securely send the public keys mutually by using the shared key obtained through negotiation.

In this way, still as shown in FIG. 2, in S207, in a subsequent process of interaction between the mobile phone and the IoT device 101, the mobile phone and the IoT device 101 may perform, by using respective private keys, digital signature on messages that need to be sent. In addition, the mobile phone may perform, by using the public key 2 of the IoT device 101, identity authentication on a message sent by the IoT device 101 (that is, S208). Similarly, the IoT device 101 may also perform, by using the public key 1 of the mobile phone, identity authentication on a message sent by the mobile phone (that is, S209). In this way, a security risk in the process of interaction between the mobile phone and the IoT device 101 is reduced. For example, the mobile phone may first send an encrypted message to a server on a network side, and then the server forwards the encrypted message to a corresponding IoT device 101. Because the message received by the server is an encrypted message, even if the message exchanged between the mobile phone and the IoT device 101 passes through the network side, the message is difficult to decrypt or leak.

However, because the hub device 102 (especially a hub device 102 without a screen) usually does not have a capability of obtaining the device information of the IoT device 101, such as a scanning capability, the hub device 102 cannot negotiate, in advance with the IoT device 101 by using the foregoing method, key information used for subsequent interaction. As a result, regardless of whether the hub device 102 interacts with the IoT device 101 in a local area network or interacts with the IoT device 101 through the server on the network side, the hub device 102 and the IoT device 101 cannot perform identity authentication on messages that are mutually sent. Therefore, a security risk in a process of interaction between the hub device 102 and the IoT device 101 is increased.

Figure 3:
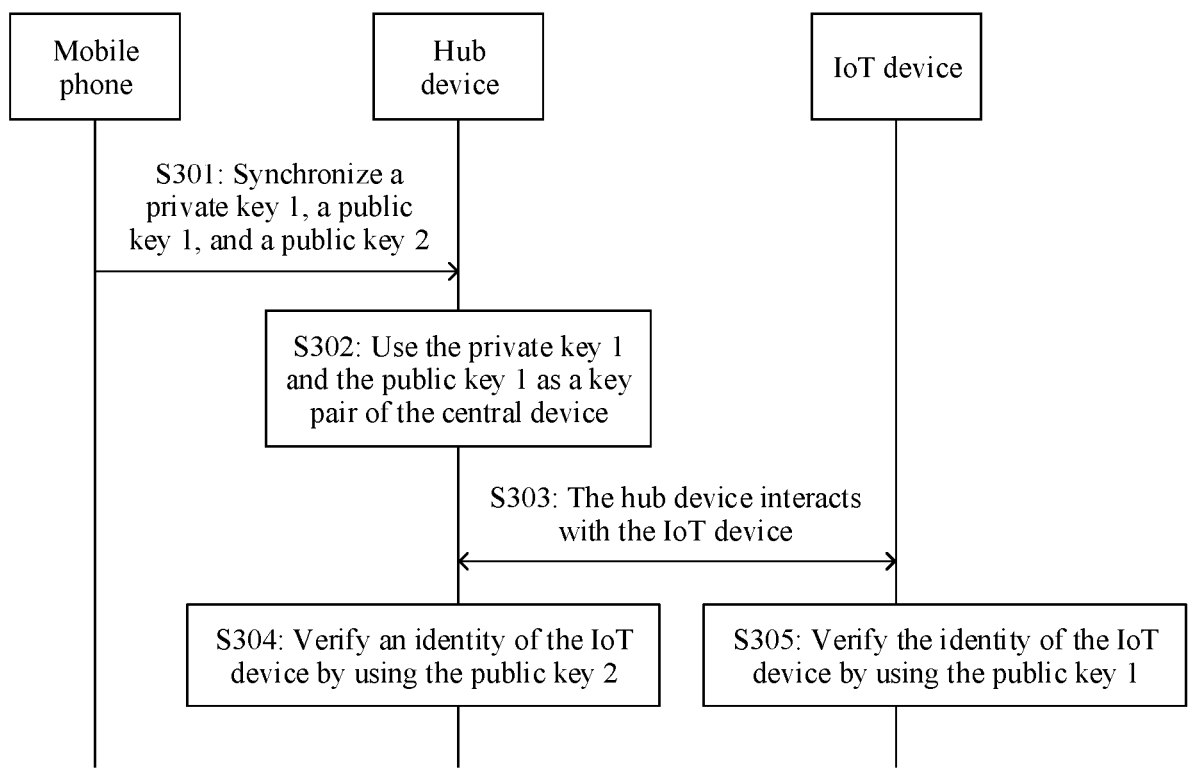
FIG. 3 is a schematic interaction diagram of a key information synchronization method according to an embodiment of this application.

In an embodiment of this application, to improve security during interaction between the hub device 102 and the IoT device 101, as shown in FIG. 3, in S301, the mobile phone may synchronize a key pair (for example, a private key 1 and a public key 1) of the mobile phone and a public key 2 of the IoT device 101 to the hub device 102. Further, in S302, the hub device 102 may set the key pair of the mobile phone to a key pair of the hub device 102. In this way, similar to the process of interaction between the mobile phone and the IoT device 101 in FIG. 2, when the hub device 102 interacts with the IoT device 101 (that is, S303), the hub device 102 and the IoT device 101 may perform, by using respective private keys, digital signature on messages that need to be sent. In addition, the hub device 102 may perform, by using the public key 2 of the IoT device 101, identity authentication on a message sent by the IoT device 101 (that is, S304). Similarly, the IoT device 101 may also perform, by using a public key of the hub device 102 (e.g., the public key 1 of the mobile phone), identity authentication on a message sent by the hub device 102 (that is, S305).

In this way, a process of interaction between the hub device 102 and the IoT device 101 is similar to the foregoing process of interaction between the mobile phone and the IoT device 101. Regardless of whether the hub device 102 controls the IoT device 101 in a local area network or controls the IoT device 101 by using a server on a network side, the hub device 102 may perform encrypted interaction with the IoT device 101 by using the private key 1, the public key 1, and the public key 2 that are synchronized from the mobile phone. In this way, a security risk in the process of interaction between the hub device 102 and the IoT device 101 is reduced.

In addition, after the mobile phone synchronizes the key pair (for example, the private key 1 and the public key 1) of the mobile phone and the public key 2 of the IoT device 101 to the hub device 102, key information in the mobile phone is the same as key information in the hub device 102. Therefore, the IoT device 101 may use the public key 1 of the mobile phone to perform identity authentication on the message sent by the mobile phone, and perform identity authentication on the message sent by the hub device 102. In this way, the IoT device 101 and the hub device 102 do not need to exchange respective public keys before interaction. Therefore, a device interaction process is simplified.

In addition, before synchronizing the key information such as the key pair to the hub device 102, the mobile phone may further first negotiate with the hub device 102 for a shared key used for current interaction. Further, the mobile phone may encrypt the key information by using the shared key and then synchronize the key information to the hub device 102, and the hub device 102 may decrypt, by using the same shared key, the key information sent by the mobile phone. This improves security when the mobile phone synchronizes the key information to the hub device 102, and avoids leakage of the key information of the mobile phone.

For example, the terminal 103 in the smart home system 100 may be a mobile phone.

Figure 4:
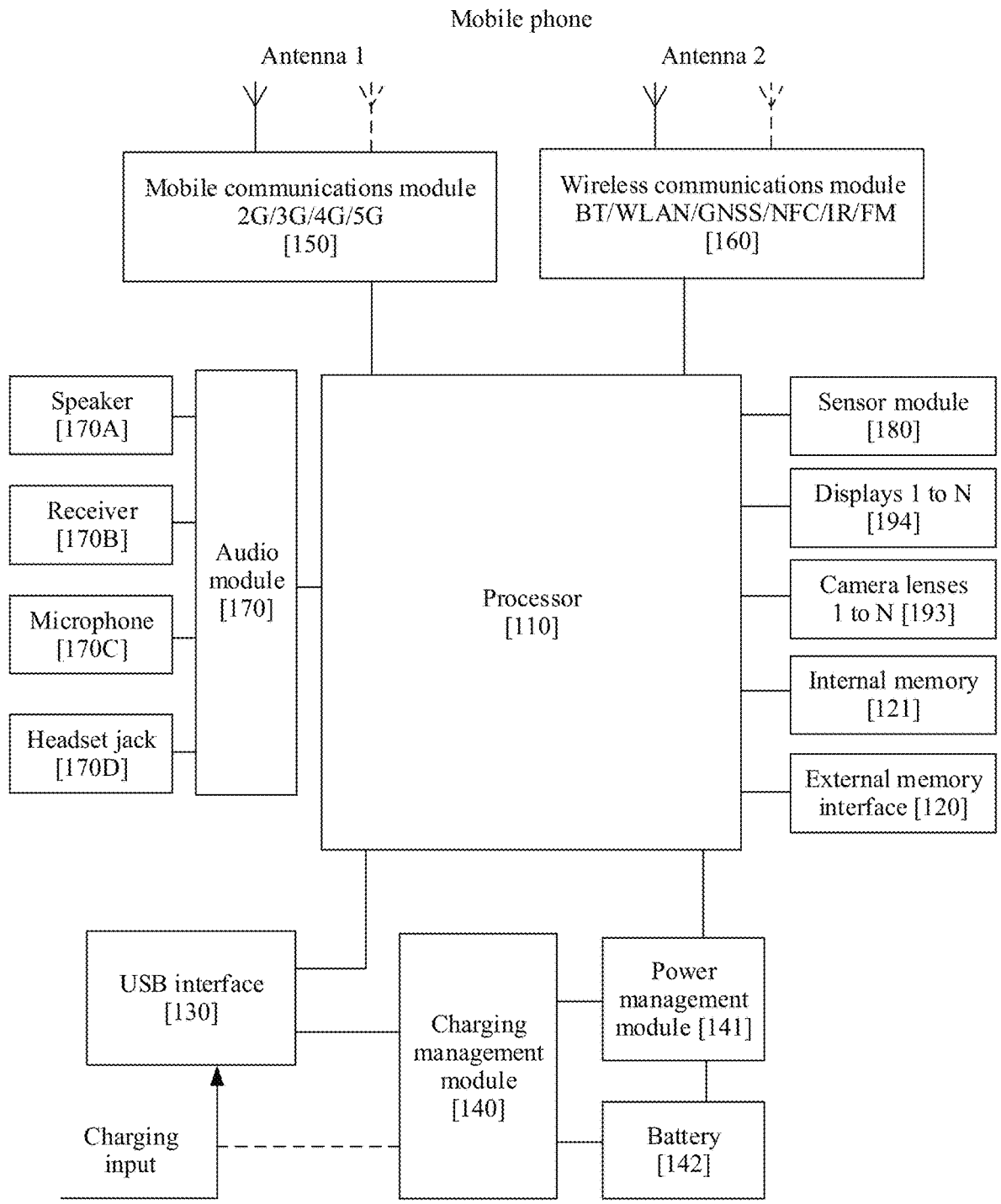
FIG. 4 is a schematic structural diagram of a terminal according to an embodiment of this application.

As shown in FIG. 4, the mobile phone may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a camera 193, a display 194, and the like.

It may be understood that the structure shown in this embodiment of this application does not constitute a specific limitation on the mobile phone. In some other embodiments of this application, the mobile phone may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent devices, or may be integrated into one or more processors.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The charging management module 140 is configured to receive a charging input from the charger. The charger may be a wireless charger or a wired charger. In some embodiments of wired charging, the charging management module 140 may receive a charging input from the wired charger through the USB interface 130. In some embodiments of wireless charging, the charging management module 140 may receive wireless charging input by using a wireless charging coil of the mobile phone. The charging management module 140 supplies power to the mobile phone by using the power management module 141 while charging the battery 142.

The power management module 141 is configured to connect the battery 142 and the charging management module 140 to the processor 110. The power management module 141 receives an input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (e.g., electric leakage or impedance). In some other embodiments, the power management module 141 may alternatively be disposed in the processor 110. In some other embodiments, the power management module 141 and the charging management module 140 may alternatively be disposed in a same device.

A wireless communication function of the mobile phone may be implemented by using the antenna 1, the antenna 2, the mobile communications module 150, the wireless communications module 160, the modem processor, the baseband processor, and the like.

The antenna 1 and the antenna 2 are configured to: transmit and receive electromagnetic wave signals. Each antenna in the mobile phone may be configured to cover one or more communication bands. Different antennas may be further multiplexed, to increase antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2G/3G/4G/5G (second, third, fourth, or fifth generation) or the like and that is applied to the mobile phone. The mobile communications module 150 may include at least one filter, a switch, a power amplifier, a low noise amplifier (LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert an amplified signal into an electromagnetic wave through the antenna 1 for radiation. In some embodiments, at least some functional modules in the mobile communications module 150 may be disposed in the processor 110. In some embodiments, at least some functional modules in the mobile communications module 150 may be disposed in a same device as at least some modules in the processor 110.

The wireless communications module 160 may provide a wireless communication solution that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like and that is applied to the mobile phone. The wireless communications module 160 may be one or more components integrated into at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave through the antenna 2 for radiation.

In some embodiments, the antenna 1 and the mobile communications module 150 of the mobile phone are coupled, and the antenna 2 and the wireless communications module 160 of the mobile phone are coupled, so that the mobile phone can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a beidou navigation satellite system (BDS), a quasi-zenith satellite system (QZSS), and/or a satellite based augmentation system (SBAS).

The mobile phone implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, or the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, quantum dot light emitting diodes (QLED), or the like. In some embodiments, the mobile phone may include one or N displays 194, where N is a positive integer greater than 1.

The mobile phone may implement a photographing function by using the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the mobile phone may include one or N cameras 193, where N is a positive integer greater than 1.

The digital signal processor is configured to process a digital signal, and may process another digital signal in addition to the digital image signal. For example, when the mobile phone selects a frequency, the digital signal processor is configured to perform Fourier transform on frequency energy, and the like.

The video codec is configured to: compress or decompress a digital video. The mobile phone may support one or more video codecs. In this way, the mobile phone can play or record videos in a plurality of coding formats, for example, moving picture experts group (MPEG)-1, MPEG-2, MPEG-3, and MPEG-4.

The external memory interface 120 may be configured to connect to an external storage card such as a micro SD card, to extend a storage capability of the mobile phone. The external memory card communicates with the processor 110 through the external memory interface 120, to implement a data storage function. For example, files such as music and a video are stored in the external memory card.

The internal memory 121 may be configured to store computer executable program code. The executable program code includes instructions. The processor 110 runs the instruction stored in the internal memory 121, to execute various function applications of the mobile phone and data processing. The internal memory 121 may include a program storage area and a data storage area. The program storage area may store an operating system, an application required by at least one function (for example, a sound playing function or an image playing function), and the like. The data storage area may store data (for example, audio data or an address book) created during use of the mobile phone, and the like. In addition, the internal memory 121 may include a high-speed random access memory, and may further include a nonvolatile memory, for example, at least one magnetic disk storage device, a flash memory device, or a universal flash storage (UFS).

The mobile phone may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to: code and decode an audio signal. In some embodiments, the audio module 170 may be disposed in the processor 110, or some functional modules of the audio module 170 are disposed in the processor 110.

The speaker 170A, also referred to as a "horn", is configured to convert an electrical audio signal into a sound signal. The mobile phone may listen to music by using the speaker 170A, or listen to a hands-free call.

The receiver 170B, also referred to as an "earpiece", is configured to convert an electrical audio signal into a sound signal. When a call is answered or voice information is received by using the mobile phone, the receiver 170B may be put close to a human ear to listen to a voice.

The microphone 170C, also referred to as a "mike" or a "microphone", is configured to convert a sound signal into an electrical signal. When making a call or sending speech information, the user may make a sound by moving a human mouth close to the microphone 170C to input a sound signal to the microphone 170C. At least one microphone 170C may be disposed in the mobile phone. In some other embodiments, two microphones 170C may be disposed in the mobile phone, to collect a sound signal and further implement a noise reduction function. In some other embodiments, three, four, or more microphones 170C may alternatively be disposed in the mobile phone, to collect a sound signal, reduce noise, further identify a sound source, implement a directional recording function, and the like.

The headset jack 170D is configured to connect to a wired headset. The headset jack 170D may be the USB interface 130, or may be a 3.5 mm open mobile terminal platform (OMTP) standard interface or a cellular telecommunications industry association of the USA (CTIA) standard interface.

The sensor module 180 may include a pressure sensor, a gyroscope sensor, a barometric pressure sensor, a magnetic sensor, an acceleration sensor, a range sensor, an optical proximity sensor, a fingerprint sensor, a temperature sensor, a touch sensor, an ambient light sensor, a bone conduction sensor, and the like.

Certainly, the mobile phone may further include one or more components such as a key, a motor, an indicator, and a SIM card interface. This is not limited in this embodiment of this application.

The following describes in detail a key information synchronization method in the embodiments of this application with reference to the accompanying drawings.

In the foregoing smart home system 100, an example in which a device, such as a router, without a screen is the hub device 102, and a mobile phone is the terminal 103 is used. Before controlling an IoT device to implement a corresponding function of the IoT device, the router may synchronize key information of the mobile phone from the mobile phone, so that during subsequent interaction between the router and the IoT device, the router uses the key information of the mobile phone as key information of the router to perform identity authentication or decryption on an exchanged message.

In addition, before the mobile phone controls the IoT device to implement a corresponding function of the IoT device, the mobile phone and the IoT device also need to exchange respective key information, so that during subsequent interaction between the mobile phone and the IoT device, a receive end may perform, by using key information of a transmit end, identity authentication or decryption on a message sent by the transmit end.

Figure 5:
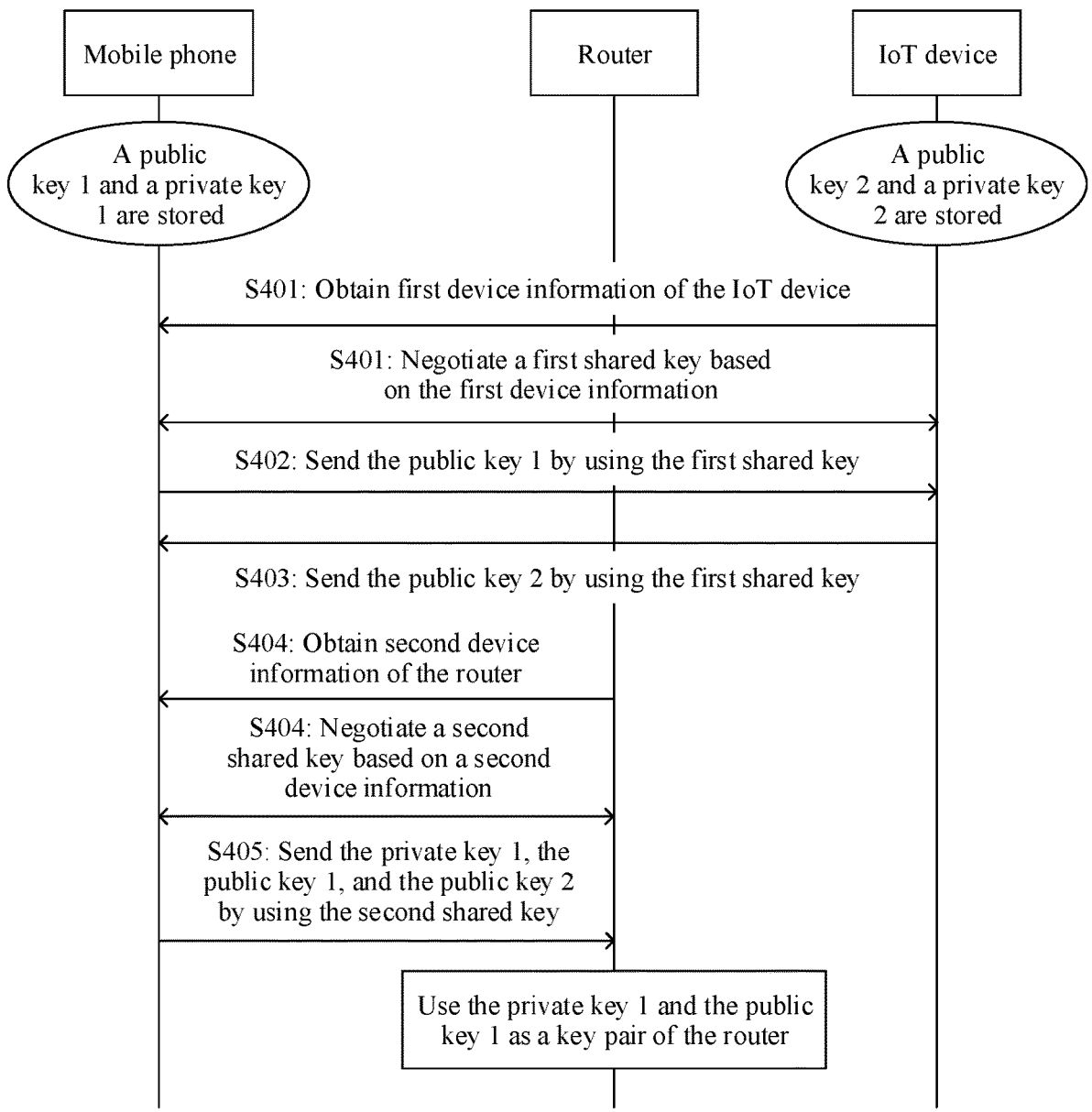
FIG. 5 is a schematic interaction diagram of a key information synchronization method according to an embodiment of this application.

For example, as shown in FIG. 5, a key information exchanging method among the mobile phone, the router, and the IoT device 101 includes the following operations S401 to S405.

S401: After the mobile phone obtains first device information of the IoT device, the mobile phone and the IoT device negotiate a first shared key based on the first device information.

The first device information may be any identifier used to identify an identity of the IoT device. For example, the first device information may be a PIN (personal identification number) code, a device name, a MAC (media access control) address, or the like of the IoT device.

For example, the first device information is the PIN code of the IoT device. The PIN code of the IoT device may be preset on the IoT device or an outer packing of the IoT device in a form of a QR code. In this case, when the mobile phone runs a smart home app, a user may use a code scanning function in the smart home app to scan the QR code on the IoT device, so as to trigger the mobile phone to obtain the PIN code of the IoT device from the QR code. Certainly, the user may alternatively manually enter the PIN code of the IoT device into the smart home app. This is not limited in this embodiment of this application.

Figure 6:
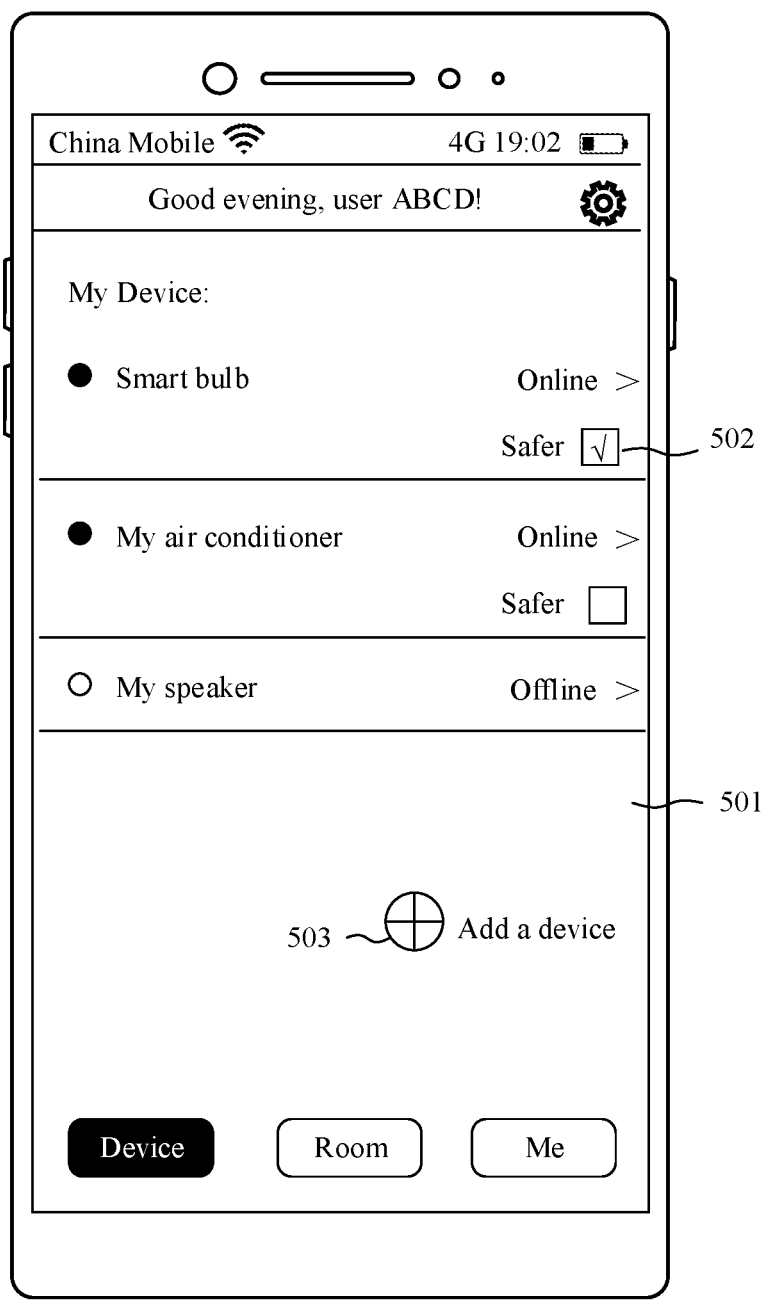
FIG. 6 is a schematic diagram of an application scenario of a key information synchronization method according to an embodiment of this application.

For example, a smart light bulb is used as the foregoing IoT device. As shown in FIG. 6, after the smart light bulb is connected to a home Wi-Fi network, when the user starts the smart home app on the mobile phone, the mobile phone may display the smart light bulb as an online device in an application interface 501 of the smart home app. In addition, the smart home app may provide, in the application interface 501, an option 502 for the IoT device, e.g., the smart light bulb. The option 502 is used to improve security when the smart light bulb interacts with another device on a local area network or a network side. If it is detected that the user enables the option 502, it indicates that the user expects to ensure security of interaction between the smart light bulb and the mobile phone or the router when the smart light bulb is subsequently controlled.

Figure 7:
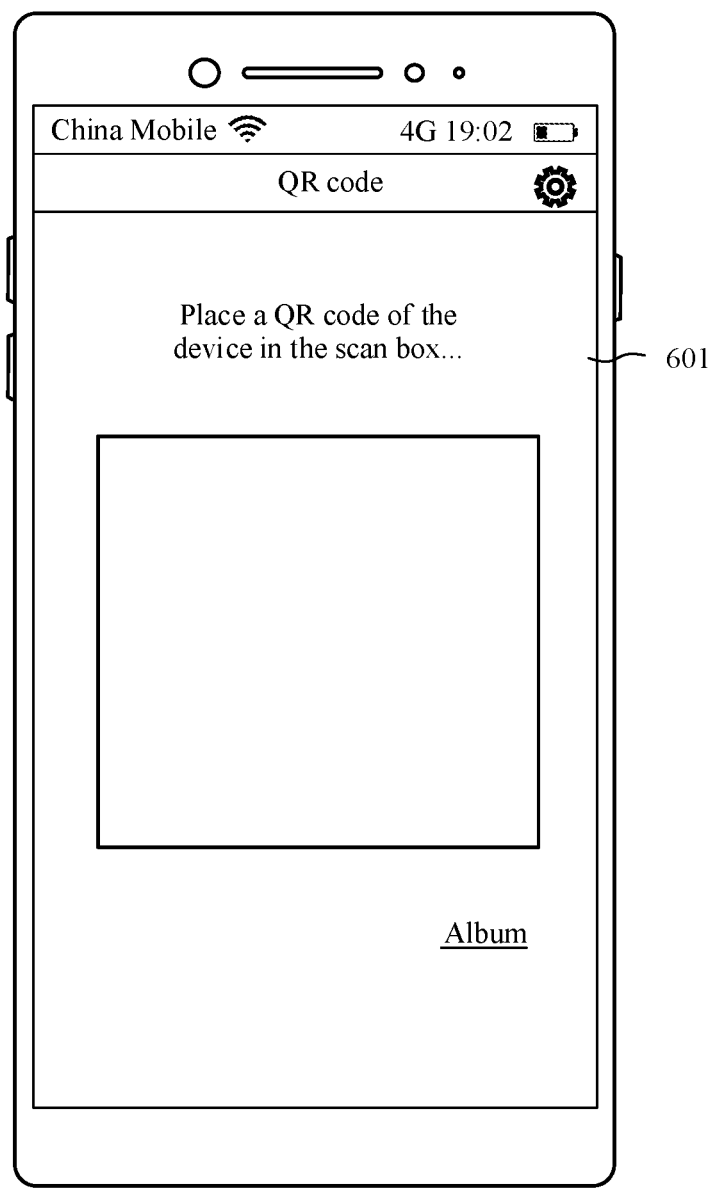
FIG. 7 is a schematic diagram of an application scenario of a key information synchronization method according to an embodiment of this application.

In this case, as shown in FIG. 7, the mobile phone may display a QR code scanning interface 601. The mobile phone may prompt, in the displayed interface 601, the user to scan the QR code on the IoT device (for example, the smart light bulb), to obtain the PIN code of the smart light bulb from the QR code.

Alternatively, when the user adds a new IoT device to the smart home app, the mobile phone may trigger the mobile phone to obtain a PIN code of the new IoT device. Still as shown in FIG. 6, the application interface 501 may include a new IoT device addition option 503. When the user uses the new IoT device for the first time, the user needs to bind the new IoT device to a registered account of the user in the smart home app. In this way, the new IoT device can be displayed in the smart home app as an online device, so that the user can control the new IoT device by using the smart home app, to implement various functions. In this case, if it is detected that the user taps the addition option 503, the mobile phone may add, according to an existing binding process, the new IoT device to the account to which the smart home app logs in, and the mobile phone may display the scanning interface 601 shown in FIG. 7 to prompt the user to scan a QR code on the IoT device, so as to obtain the PIN code of the new IoT device.

After obtaining the PIN code of the IoT device, the mobile phone may negotiate, with the IoT device based on the PIN code, a shared key (e.g., the first shared key) used in current interaction. The first shared key obtained through negotiation is shared by the mobile phone and the IoT device. During interaction, the mobile phone and the IoT device each may determine, by determining whether the other party has the same first shared key, whether an identity of the other party is valid. The first shared key obtained through negotiation may have specific time validity. For example, the first shared key obtained through negotiation between the mobile phone and the IoT device is valid in only 10 minutes, and when the mobile phone and the IoT device interact with each other by using the first shared key 10 minutes later, the mobile phone and the IoT device each cannot determine validity of the identity of the other party based on the first shared key.

For example, after obtaining the PIN code of the IoT device, the mobile phone may perform SPEKE (simple password exponential key exchange) negotiation with the IoT device based on the PIN code, to obtain the first shared key (e.g., DataEncKey1) shared by the mobile phone and the IoT device.

S402: The mobile phone encrypts a public key of the mobile phone by using the first shared key, and then sends the encrypted public key to the IoT device.

For example, the mobile phone may generate a key pair of the mobile phone in advance by using a preset algorithm such as an EdDSA (edwards-curve digital signature algorithm) or an RSA (Rivest-Shamir-Adleman) encryption algorithm.

The key pair of the mobile phone includes a public key 1 and a private key 1 of the mobile phone. Data encrypted by using the public key 1 can be decrypted only by using the corresponding private key 1. In addition, after the mobile phone performs digital signature by using the private key 1, a device that obtains the digital signature can verify the digital signature only by using the corresponding public key 1, so as to verify identity validity of the mobile phone.

For example, the mobile phone may automatically generate the key pair of the mobile phone when the user installs the smart home app. Alternatively, the mobile phone may automatically generate the key pair of the mobile phone when detecting that the user enables, in the application interface 501, the option 502 for improving security for the IoT device. Alternatively, the mobile phone may automatically generate the key pair of the mobile phone when detecting that the user adds a new IoT device. This is not limited in this embodiment of this application.

After the mobile phone and the IoT device obtain the first shared key through negotiation, the mobile phone may encrypt the public key 1 of the mobile phone by using the first shared key, and send the encrypted public key 1 to the corresponding IoT device. In this case, after receiving the encrypted public key 1, the IoT device may decrypt the public key 1 of the mobile phone by using the first shared key and store the public key 1. Subsequently, after the IoT device receives a message on which the mobile phone performs digital signature by using the private key 1, the IoT device may verify the digital signature in the message by using the public key 1 of the mobile phone, to verify identity validity of a sender (e.g., the mobile phone). In addition, the IoT device may also encrypt, by using the public key 1 of the mobile phone, a message sent to the mobile phone, and the mobile phone may decrypt, by using the private key 1, the message sent by the IoT device.

S403: The IoT device encrypts a public key of the IoT device by using the first shared key, and then sends the encrypted public key of the IoT device to the mobile phone.

Similar to the key pair of the mobile phone, the IoT device may also generate a key pair of the IoT device in advance by using the preset algorithm such as the EdDSA or RSA encryption algorithm. The key pair of the IoT device includes a public key 2 and a private key 2 of the IoT device.

For example, the IoT device may automatically generate the key pair of the IoT device when the IoT device is powered on for the first time. Alternatively, when the mobile phone detects that the user enables, in the application interface 501, the option 502 for improving security for the IoT device, the mobile phone may send a key pair generation instruction to the IoT device. Further, the IoT device may automatically generate the key pair of the IoT device in response to the generation instruction. This is not limited in this embodiment of this application.

Similar to operation S402, after the mobile phone and the IoT device obtain the first shared key through negotiation, the IoT device may encrypt the public key 2 of the IoT device by using the first shared key, and send the encrypted public key 2 to the mobile phone. In this case, after receiving the encrypted public key 2, the mobile phone may decrypt the public key 2 of the IoT device by using the first shared key, and store the public key 2. Subsequently, after the mobile phone receives a message on which the IoT device performs digital signature by using the private key 2, the mobile phone may verify the digital signature in the message by using the public key 2 of the IoT device, to verify identity validity of a sender (e.g., the IoT device). In addition, the mobile phone may also encrypt, by using the public key 2 of the IoT device, a message sent to the IoT device, and the IoT device may decrypt, by using the private key 2, the message sent by the mobile phone.

In other words, in operations S401 to S403, the mobile phone and the IoT device may negotiate the first shared key, encrypt respective public keys (e.g., the public key 1 and the public key 2) by using the first shared key, and send the encrypted public keys to each other, to avoid leakage of the public keys of the mobile phone and the IoT device.

In addition, after the mobile phone and the IoT device each obtain the public key of the other party, in a subsequent process of interaction between the mobile phone and the IoT device, the mobile phone and the IoT device each may encrypt or verify a message in the interaction process by using the public key of the other party, so as to improve security in the process of interaction between the mobile phone and the IoT device, and reduce a risk of user privacy leakage.

It should be noted that the foregoing operations S401 to S403 are described by using an example in which the mobile phone and the IoT device negotiate the first shared key based on the PIN code, and encrypt and transmit respective public keys. It may be understood that the mobile phone and the IoT device may alternatively synchronize respective public keys in another manner. For example, the mobile phone may establish a relatively secure P2P connection to the IoT device, and then the mobile phone and the IoT device may synchronize respective public keys by using the P2P connection. This is not limited in this embodiment of this application.

S404: After the mobile phone obtains second device information of the router, the mobile phone and the router negotiate a second shared key based on the second device information.

Similar to the first device information, the second device information may be any identifier used to identify an identity of the router. For example, the second device information may be a PIN (personal identification number) code, a device name, a MAC (media access control) address, or the like of the router.

For example, the second device information is the PIN code of the router, and the PIN code of the router may be preset on the router or an outer packing of the router in a form of a QR code. In this case, when the mobile phone runs the smart home app, the user may use the code scanning function in the smart home app to scan the QR code on the router, so as to trigger the mobile phone to obtain the PIN code of the router from the QR code. Certainly, the user may alternatively manually enter the PIN code of the router into the smart home app. This is not limited in this embodiment of this application.

Similar to operation S401, after obtaining the PIN code of the router, the mobile phone may negotiate, with the router based on the PIN code, a shared key (e.g., the second shared key) used in current interaction. The second shared key obtained through negotiation is shared by the mobile phone and the router. During interaction, the mobile phone and the router each may determine, by determining whether the other party has the same second shared key, whether an identity of the other party is valid.

For example, after obtaining the PIN code of the router, the mobile phone may perform SPEKE negotiation with the router based on the PIN code, to obtain the second shared key (e.g., DataEncKey2) shared by the mobile phone and the router.

S405: The mobile phone encrypts the key pair of the mobile phone and the public key of the IoT device by using the second shared key, and then sends the encrypted key pair of the mobile phone and the encrypted public key of the IoT device to the router.

In operation S403, the mobile phone has obtained the public key 2 of the IoT device, and the mobile phone has pre-generated the key pair (e.g., the public key 1 and the private key 1) of the mobile phone. Therefore, after the mobile phone and the router obtain the second shared key through negotiation, the mobile phone may encrypt the key pair (e.g., the public key 1 and the private key 1) of the mobile phone and the public key 2 of the IoT device by using the second shared key, and send the encrypted public key 1, private key 1, and public key 2 to the router (e.g., the hub device). In this way, the mobile phone can securely synchronize the key pair of the mobile phone and the public key of the IoT device to the router by using the second shared key.

After receiving the encrypted public key 1, private key 1, and public key 2, the router may decrypt the public key 1 and the private key 1 of the mobile phone and the public key 2 of the IoT device by using the second shared key. Further, the router may store the public key 2 of the IoT device, and the router may set the key pair (e.g., the public key 1 and the private key 1) of the mobile phone to a key pair of the router. In other words, a private key of the router is the private key 1, and a public key of the router is the public key 1. In this case, key information in the mobile phone includes the key pair (e.g., the public key 1 and the private key 1) of the mobile phone and the public key 2 of the IoT device, and key information in the router includes the key pair (e.g., the public key 1 and the private key 1) of the router and the public key 2 of the IoT device. It can be learned that, after operation S405, the key information in the mobile phone is the same as the key information in the router.

In this way, because the key information of the router is the same as the key information of the mobile phone, a subsequent process of interaction between the router and the IoT device is similar to the process of interaction between the mobile phone and the IoT device. For example, after the router receives a message on which the IoT device performs digital signature by using the private key 2 of the IoT device, the router may verify the digital signature in the message by using the public key 2 (e.g., the public key of the IoT device), to verify identity validity of a sender (e.g., the IoT device). For another example, when the router needs to send a message to the IoT device, the router may perform digital signature by using the private key 1 (e.g., the private key of the mobile phone). When receiving the message from the router, the IoT device may verify the digital signature in the message by using the public key 1 of the mobile phone, to verify identity validity of a sender (the router).

In other words, in an embodiment of this application, the mobile phone may synchronize the key information of the mobile phone to the router, so that when the router subsequently interacts with the IoT device, the router may use the key information of the mobile phone as the key information of the router. This improves security in the process of interaction between the router (e.g., the hub device) and the IoT device, and reduces the risk of user privacy leakage.

Similarly, after using the private key 1 and the public key 1 of the mobile phone as the key pair of the router, the router may further perform encrypted interaction with the mobile phone. For example, after the router receives a message on which the mobile phone performs digital signature by using the private key 1 of the mobile phone, the router may use the public key 1 to verify the digital signature in the message, to verify identity validity of a sender (e.g., the mobile phone). For another example, when the router needs to send a message to the mobile phone, the router may use the private key 1 to perform digital signature. After receiving the message from the router, the mobile phone may use the public key 1 of the mobile phone to verify the digital signature in the message, so as to verify identity validity of a sender (the router).

Certainly, in addition to synchronizing the key pair of the mobile phone and the public key of the IoT device to the router by using the second shared key, a person skilled in the art may alternatively set another manner to synchronize the key pair of the mobile phone and the public key of the IoT device to the router. This is not limited in this embodiment of this application.

Figure 8:
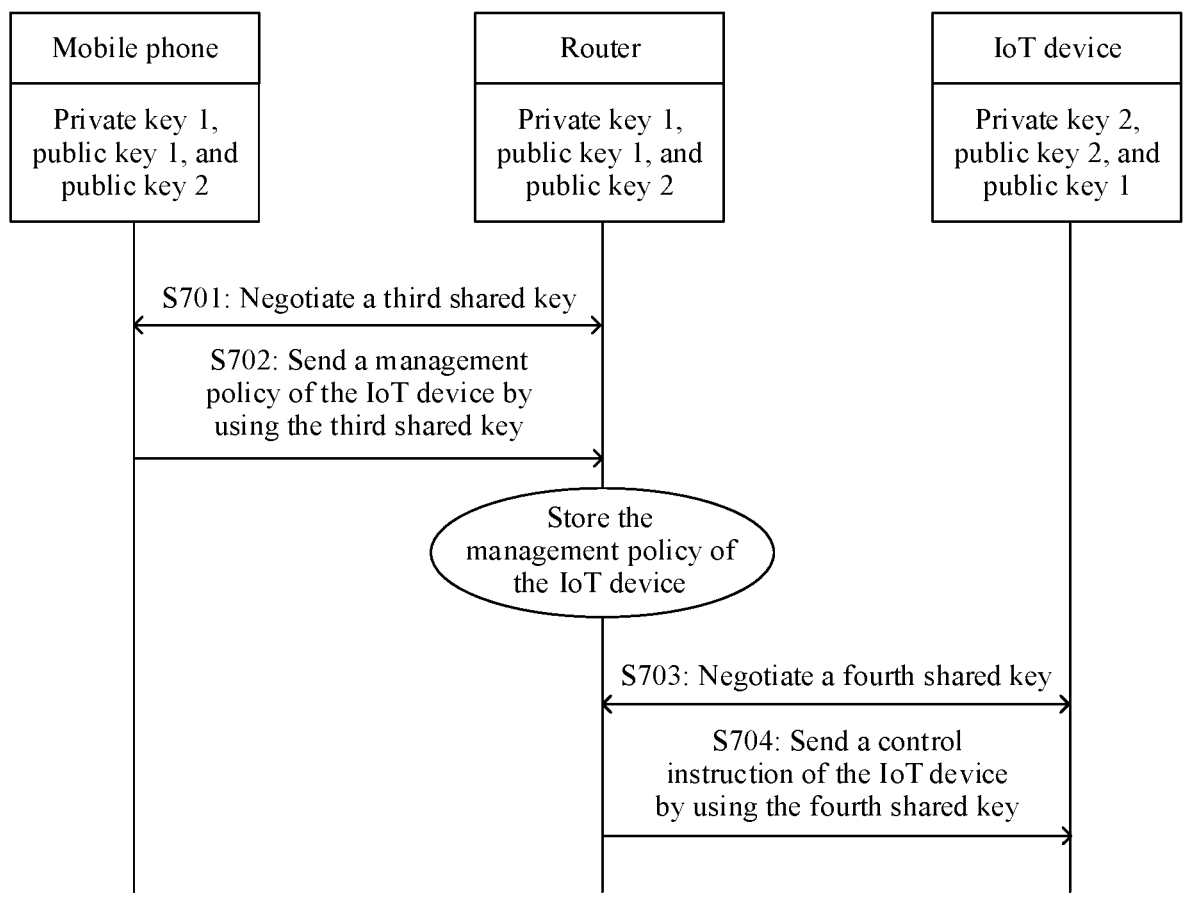
FIG. 8 is a schematic interaction diagram of a key information synchronization method according to an embodiment of this application.

For example, as shown in FIG. 8, after the router, the mobile phone, and the IoT device synchronize the key information with each other by using the foregoing operations S401 to S405, the key information in the mobile phone includes the key pair (e.g., the private key 1 and the public key 1) of the mobile phone and the public key 2 of the IoT device, the key information in the router includes the key pair (e.g., the private key 1 and the public key 1) of the router and the public key 2 of the IoT device, and key information in the IoT device includes the key pair (e.g., the private key 2 and the public key 2) of the IoT device and the public key 1 of the mobile phone.

Subsequently, the router, the mobile phone, and the IoT device may interact with each other based on the key information stored on the router, the mobile phone, and the IoT device, to implement a related control function on the IoT device. For example, still as shown in FIG. 8, a method for performing device management on an IoT device by a router includes the following operations S701 to S704.

S701: A mobile phone and the router negotiate a third shared key based on key information of each other.

S702: The mobile phone encrypts a management policy of the IoT device by using the third shared key, and sends the encrypted management policy to the router.

Before the router is used as a hub device to control the IoT device to implement a related control function, operations S701 and S702 are performed between the mobile phone and the router, to deliver the management policy that is of the IoT device and that is set in the mobile phone to the router.

The management policy of the IoT device is a specific working rule of the IoT device. Generally, the management policy of the IoT device includes a trigger condition and policy content. When the trigger condition in the management policy is met, the mobile phone or the hub device (for example, the router) may control, based on the corresponding policy content, the IoT device to perform a corresponding operation.

For example, the management policy of the IoT device may be an IFTTT (short for if this then that) rule, and a purpose thereof is "Put the internet to work for you" (Put the internet to work for you). An IFTTT rule may include a trigger condition and policy content. In other words, if the trigger condition in the IFTTT rule is met, an operation in the corresponding policy content in the IFTTT rule is performed.

The trigger condition may also be referred to as a trigger event. If a device A performs one or more operations in the IFTTT rule, or a parameter detected by a device A meets one or more conditions, a device B performs a corresponding operation. The device A may be referred to as a condition device, and the device B may be referred to as an execution device. In the IFTTT rule, there may be one or more condition devices, and there may be one or more execution devices. In this embodiment of this application, both the condition device and the execution device may be IoT devices.

For example, a management policy 1 of an IoT device, namely, a camera, may be turning on the camera at 6:00 p.m. every day. In other words, a trigger condition in the management policy 1 is 6:00 p.m. every day, and policy content in the management policy 1 is turning on the camera. For another example, when the IoT devices are a smart light bulb and an intelligent lock, a management policy 2 of the IoT devices may be set as follows: When a working state of the intelligent lock is an open state, the smart light bulb is triggered to start to work. In other words, a trigger condition in the management policy 2 is that the working state of the intelligent lock is the open state, and policy content in the management policy 2 is turning on the smart light bulb.

Figure 9:
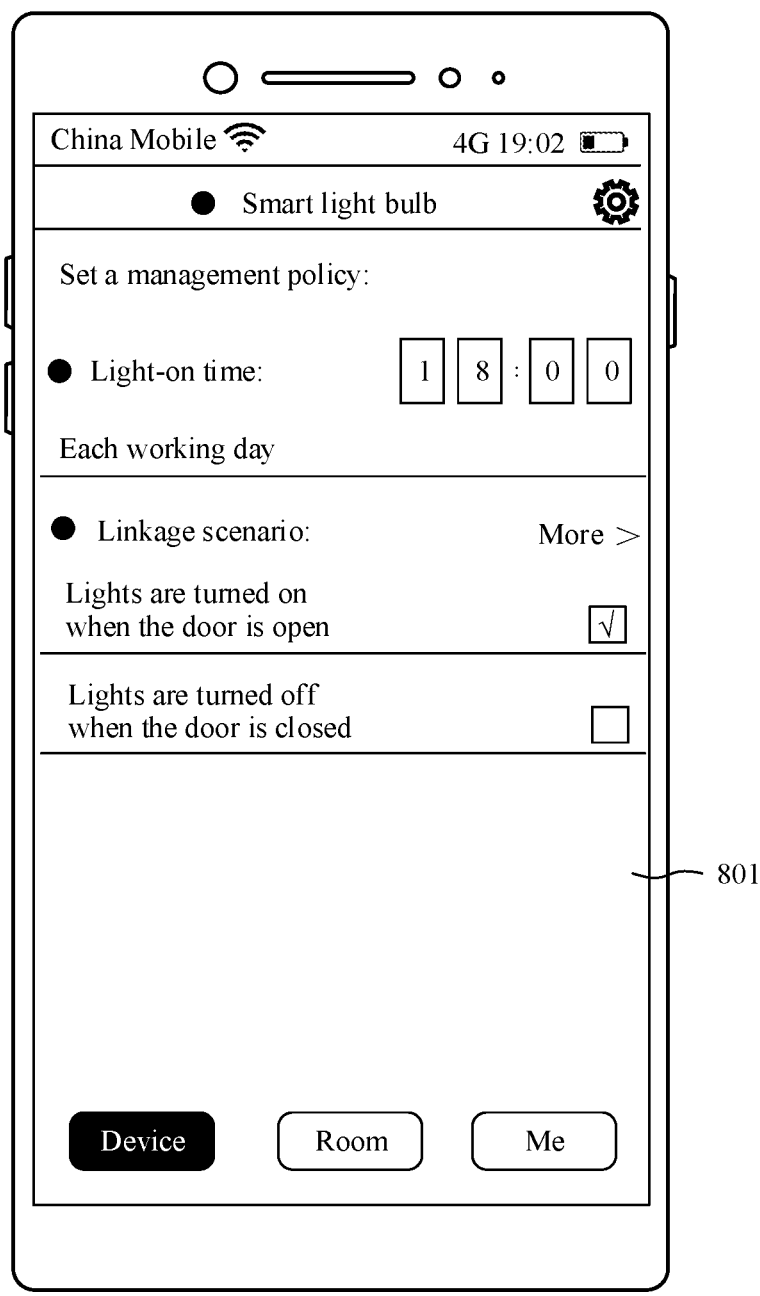
FIG. 9 is a schematic diagram of an application scenario of a key information synchronization method according to an embodiment of this application.

For example, as shown in FIG. 9, a user may open a setting interface 801 of an IoT device in a smart home app. Further, the user may set a corresponding management policy for the IoT device in the setting interface 801. In response to the management policy set by the user in the setting interface 801, the mobile phone may store the management policy of the IoT device. In this way, the mobile phone can obtain the management policy that is set by the user for each IoT device. Certainly, the mobile phone may alternatively obtain the management policy of each IoT device from a server or another device. This is not limited in this embodiment of this application.

To securely deliver the management policy of the IoT device to the router, in operation S701, the mobile phone and the router may negotiate, based on key information of each other and a preset key agreement algorithm, a shared key (e.g., a third shared key) used for transmitting the management policy. For example, the mobile phone and the router may negotiate the third shared key according to an STS (station-to-station) protocol.

Figure 10:
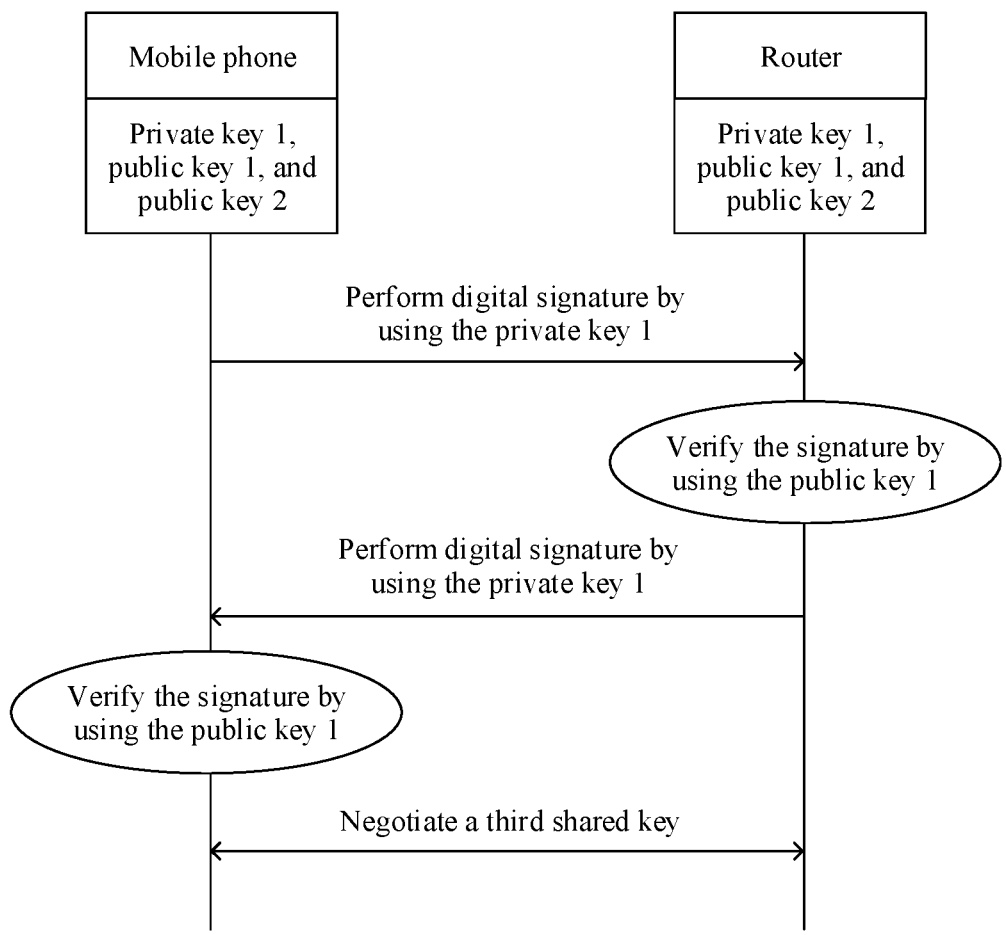
FIG. 10 is a schematic interaction diagram of a key information synchronization method according to an embodiment of this application.

In a process of negotiating the third shared key, as shown in FIG. 10, the mobile phone may perform, by using a private key 1 of the mobile phone, signing a digital signature on a message that needs to be sent to the router. After receiving the message sent by the mobile phone, the router may perform identity authentication on the digital signature in the message by using a public key 1 of the mobile phone, so as to determine identity validity of a sender of the message (e.g., the mobile phone).

Similarly, still as shown in FIG. 10, in the process of negotiating the third shared key, the router may perform, by using the private key 1 of the router (e.g., the private key 1 of the mobile phone), digital signature on a message that needs to be sent to the mobile phone. After receiving the message sent by the router, the mobile phone may perform identity authentication on the digital signature in the message by using the public key 1 of the router (e.g., the public key 1 of the mobile phone), so as to determine identity validity of a sender of the message (e.g., the router). After the mobile phone and the router successfully verify the validity of identities of each other, the mobile phone and the router may generate the third shared key according to a same key negotiation algorithm.

Further, in operation S702, after the mobile phone and the router obtain the third shared key through negotiation, the mobile phone may encrypt the management policy of the IoT device by using the third shared key, and send the encrypted management policy to the router. After receiving the encrypted management policy sent by the mobile phone, the router may decrypt the management policy of the IoT device by using the negotiated third shared key. In this way, the mobile phone may securely deliver the management policy of the IoT device to the router by using the third shared key, to avoid leakage of the management policy of the IoT device.

In the foregoing operations S701 and S702, an example in which the mobile phone and the router negotiate the third shared key, to securely transmit the management policy of the IoT device by using the third shared key is used for description. It may be understood that the mobile phone and the router may alternatively transmit the management policy of the IoT device in another manner. This is not limited in this embodiment of this application.

For example, the mobile phone may encrypt the management policy of the IoT device by using the public key 1 of the router (e.g., the public key 1 of the mobile phone), and send the encrypted management policy to the router. After receiving the encrypted management policy of the IoT device, the router may perform decryption by using the private key 1 of the router (e.g., the private key 1 of the mobile phone), so as to obtain a plaintext of the management policy of the IoT device, and ensure security of transmitting the management policy of the IoT device.

In addition, the mobile phone may periodically (for example, at 9:00 every morning) send the management policy of the IoT device to the router according to the foregoing method. Alternatively, when detecting that the user updates a management policy of an IoT device, the mobile phone may automatically send an updated management policy of the IoT device to the router according to the foregoing method. This is not limited in this embodiment of this application.

In some other embodiments, in addition to obtaining the management policy of the IoT device from the mobile phone, the hub device (for example, the router) may further obtain the management policy of the IoT device from a server or another device. Alternatively, the user may manually set the management policy of the IoT device on the hub device. For example, in an example in which a smart speaker is the hub device, the user may input management policies of one or more IoT devices to the smart speaker in a voice manner. After receiving the management policies that are entered by the user in the voice manner, the smart speaker may interact with a corresponding server, to parse the management policies of the IoT device in a text form. In this case, the smart speaker, as the hub device, may store the management policies that are of the IoT devices and that are parsed out by the server.

S703: The router and the IoT device negotiate a fourth shared key based on the key information of the router and the IoT device.

S704: The router sends an encrypted control instruction to the IoT device based on the management policy of the IoT device by using the fourth shared key.

After obtaining the management policy of each IoT device, the router may control, according to the management policy, each IoT device to implement a corresponding function. For example, the router may monitor in real time whether a trigger condition in each management policy is met. If the trigger condition in the management policy is met, the router may control, based on policy content in the management policy and by performing operations S703 and S704, a corresponding IoT device to perform a corresponding operation.

For example, the trigger condition in the management policy 2 is that the working state of the intelligent lock is the open state, and the policy content in the management policy 2 is turning on the smart light bulb. The router may obtain a working status of each IoT device in a smart home network. For example, when the working state of the intelligent lock is updated from a closed state to the open state, it indicates that a door at the user's home is opened, and the intelligent lock may report the latest working state (e.g., the open state) to the router. The router may determine, based on the working state reported by the intelligent lock, that the trigger condition in the management policy 2 is met. In this case, the router needs to send a turn-on instruction to the smart light bulb, to trigger the smart light bulb to perform a light turn-on operation, so as to implement the policy content in the management policy 2, that is, a function of turning on the smart light bulb.

For example, when the trigger condition in the management policy 2 is met, as described in operation S703, the router and the IoT device (e.g., the smart light bulb) may negotiate, based on the key information of each other and the preset key agreement algorithm, a shared key (e.g., the fourth shared key) used for this interaction. For example, the router and the smart light bulb may use the STS protocol to negotiate the fourth shared key.

Figure 11:
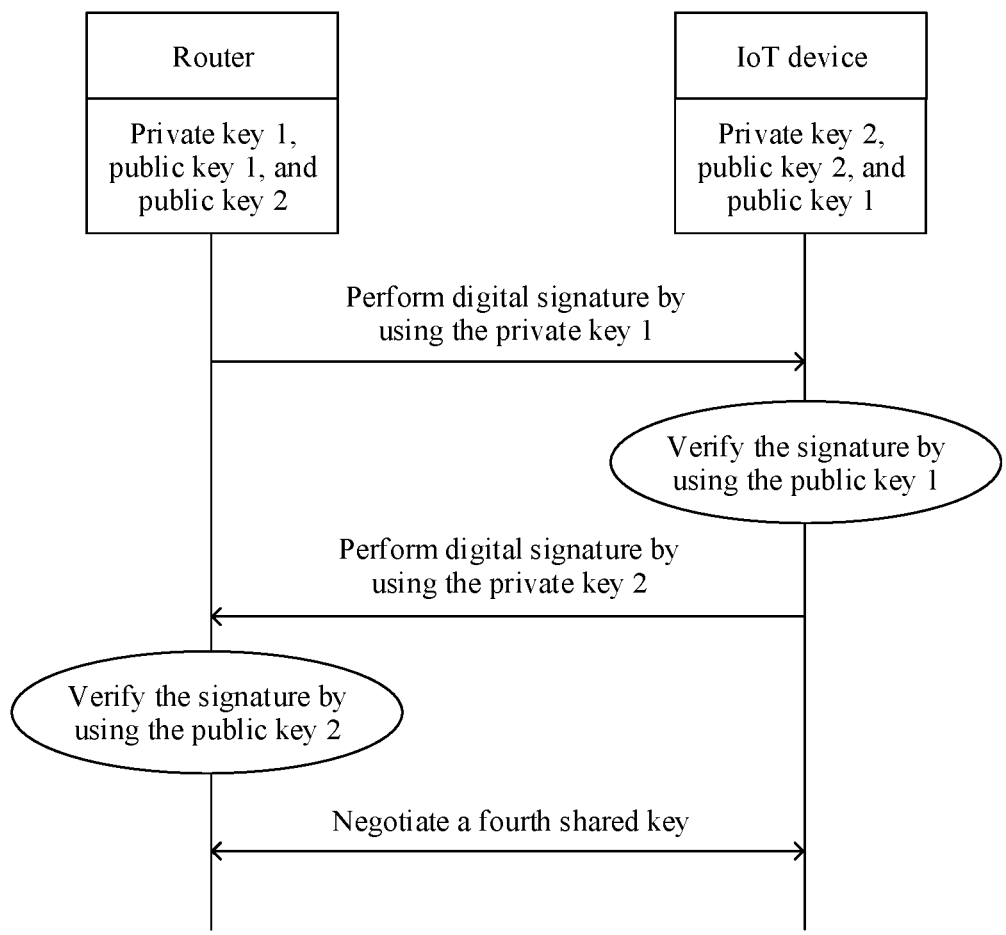
FIG. 11 is a schematic interaction diagram of a key information synchronization method according to an embodiment of this application.

In a process of negotiating the fourth shared key, as shown in FIG. 11, the router may perform, by using the private key 1 of the router (e.g., the private key 1 of the mobile phone), digital signature on a message that needs to be sent to the smart light bulb. After receiving the message sent by the router, the smart light bulb may perform identity authentication on the digital signature in the message by using the public key 1 of the router (e.g., the public key 1 of the mobile phone), so as to determine identity validity of a sender of the message (e.g., the router).

Similarly, still as shown in FIG. 11, in a process of negotiating the fourth shared key, the smart light bulb may use the private key 2 of each other to perform digital signature on a message that needs to be sent to the router. After receiving the message sent by the smart light bulb, the router may perform identity authentication on the digital signature in the message by using the public key 2 of the smart light bulb, so as to determine identity validity of a sender of the message (e.g., the smart light bulb). After the router and the smart light bulb successfully verify validity of identities of each other, the router and the smart light bulb may generate the fourth shared key according to the same key negotiation algorithm.

Further, in operation S704, after the router and the smart light bulb obtain the fourth shared key through negotiation, the router may encrypt, by using the fourth shared key, the turn-on instruction sent to the smart light bulb this time, and send the encrypted turn-on instruction to the smart light bulb. After receiving the encrypted turn-on instruction sent by the router, the smart light bulb may decrypt the turn-on instruction by using the fourth shared key obtained through negotiation. Further, the smart light bulb may respond to the turn-on instruction to perform a light turn-on operation, so as to implement the policy content in the management policy 2.

When the router and the smart light bulb exchange control instructions, the fourth shared key dynamically negotiated by the router and the smart light bulb based on the key information of each other is used. Therefore, it is difficult for another device to obtain the plaintext of the control instruction sent by the router to the smart light bulb, so as to improve security of the interaction between the router (e.g., the hub device) and the smart light bulb (the IoT device) and reduce a risk of user privacy leakage.

In the foregoing operations S703 and S704, an example in which the router and the IoT device negotiate the fourth shared key, to securely transmit the control instruction of the IoT device by using the fourth shared key is used for description. It may be understood that the router and the IoT device may alternatively transmit the control instruction of the IoT device in another manner, this is not limited in this embodiment of this application.

For example, the router may encrypt the control instruction of the IoT device by using the public key 2 of the IoT device, and send the encrypted control instruction to the corresponding IoT device. After receiving the encrypted control instruction, the IoT device may decrypt the control instruction by using the private key 2 of the IoT device, to obtain the plaintext of the control instruction, so as to ensure security of transmitting the control instruction between the router and the IoT device.

It may be learned that because the router (e.g., the hub device) synchronizes the key pair of the mobile phone and the public key of the IoT device from the mobile phone in advance, in a subsequent process in which the router controls the IoT device, the router may use the key information of the mobile phone as the key information of the router, so as to reduce a security risk in the interaction between the router and the IoT device. In addition, because the IoT device obtains the public key of the mobile phone in advance, the IoT device can also correctly verify, by using the public key of the mobile phone, the message sent by the router, and does not need to additionally obtain the public key of the router, so as to simplify a device interaction process.

Figure 12:
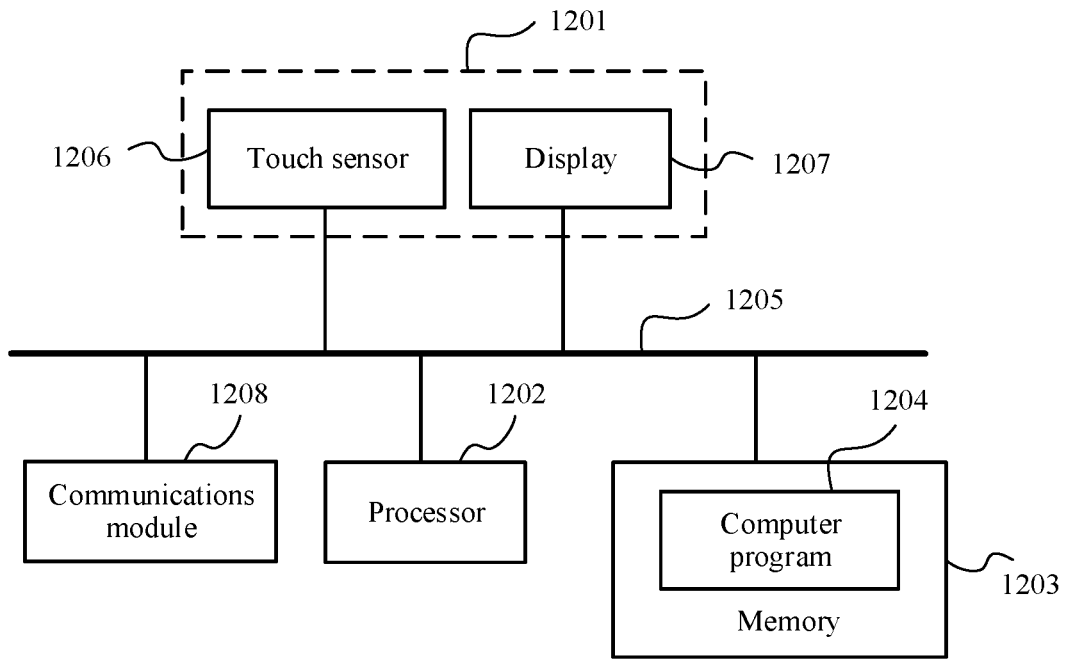
FIG. 12 is a schematic structural diagram of a terminal according to an embodiment of this application.

As shown in FIG. 12, an embodiment of this application discloses a terminal, for example, a mobile phone. The terminal includes a touchscreen 1201, where the touchscreen 1201 includes a touch sensor 1206 and a display 1207; a communications module 1208; one or more processors 1202; one or more memories 1203; one or more application programs (not shown); and one or more computer programs 1204. The foregoing components may be connected by using one or more communications buses 1205. The one or more computer programs 1204 are stored in the memory 1203, and are configured to be executed by the one or more processors 1202. The one or more computer programs 1204 include instructions, and the instructions may be used to perform related operations of the terminal (e.g., the mobile phone) in operations S401 to S405 and operations S701 to S704 in the foregoing embodiments.

Figure 13:
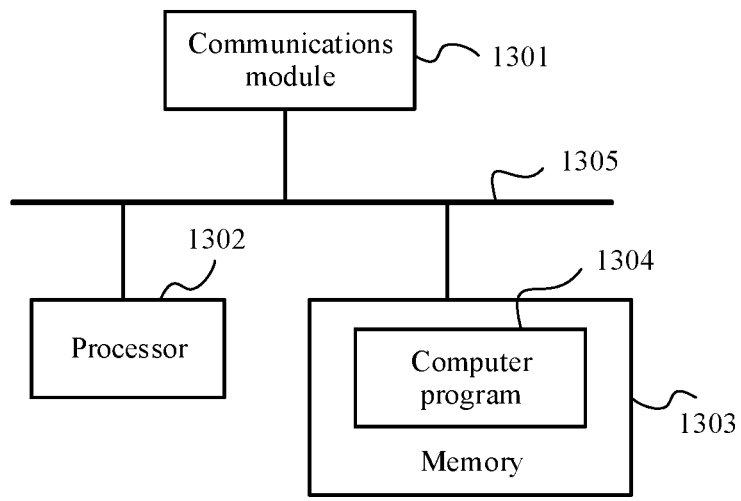
FIG. 13 is a schematic structural diagram of a hub device according to an embodiment of this application.

As shown in FIG. 13, an embodiment of this application discloses a hub device, for example, a router. The hub device includes a communications module 1301, one or more processors 1302, one or more memories 1303, and one or more computer programs 1304. The foregoing components may be connected by using one or more communications buses 1305. The one or more computer programs 1304 are stored in the memory 1303, and are configured to be executed by the one or more processors 1302. The one or more computer programs 1304 include instructions, and the instructions may be used to perform related operations of the hub device (e.g., the router) in operations S401 to S405 and operations S701 to S704 in the foregoing embodiments.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

Functional units in the embodiments of this application may be integrated into a processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) to perform all or some of the operations of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodi-

What is claimed is:

1. A method for synchronizing key information, comprising:
   sending, by a terminal, a first public key of the terminal to an internet of things (IOT) device;
   obtaining, by the terminal, a second public key of the IoT device from the IoT device;
   sending, by the terminal, first key information to a hub device, wherein the first key information comprises a first private key of the terminal, the first public key, and the second public key;
   using, by the hub device, the first private key and the first public key in the first key information as a key pair of the hub device;
   when the hub device sends a first message to the IoT device, signing, by the hub device, a first digital signature on the first message using the first private key, and sending the signed first message to the IoT device;
   performing, by the IoT device, identity authentication on the signed first message by using the first public key;
   when the IoT device sends a second message to the hub device, signing a second digital signature on the second message using a second private key of the IoT device, and sending the signed second message to the hub device;
   performing, by the hub device, identity authentication on the signed second message using the second public key;
   when the terminal sends a third message to the hub device, signing, by the terminal, a third digital signature on the third message by using the first private key, and sending the signed third message to the hub device; and
   performing, by the hub device, identity authentication on the signed third message using the first public key.

2. The method according to claim 1, wherein before sending the first public key of the terminal to the IoT device, the method further comprises:
   obtaining, by the terminal, first device information of the IoT device, wherein the first device information comprises a personal identification number (PIN) code of the IoT device; and
   negotiating, by the terminal, a first shared key with the IoT device based on the first device information; and
   the sending, by a terminal, a first public key of the terminal to an IoT device comprises:
   encrypting, by the terminal, the first public key using the first shared key, and sending the encrypted first public key to the IoT device.

3. The method according to claim 2, wherein before sending the first key information to the hub device, the method further comprises:
   obtaining, by the terminal, second device information of the hub device, wherein the second device information comprises a PIN code of the hub device; and
   negotiating, by the terminal, a second shared key with the hub device based on the second device information; and
   wherein sending the first key information to the hub device comprises:
   encrypting, by the terminal, the first key information using the second shared key, and sending the encrypted first key information to the hub device.

4. A system for synchronizing key information, comprising:
   a hub device;
   a terminal having a key pair including a first private key and a first public key; and
   an internet of things (IOT) device having a key pair including a second private key and a second public key, wherein
   the IoT device is configured to obtain the first public key from the terminal;
   the terminal is configured to obtain the second public key from the IoT device
   and to send first key information to the hub device, wherein the first key information comprises the first private key, the first public key, and the second public key; and
   the hub device is configured to: receive the first key information sent by the terminal, use the first private key and the first public key in the first key information as a key pair of the hub device, and perform encrypted interaction with the IoT device using the first key information.

5. The system according to claim 4, wherein
   the hub device is further configured to: sign a first digital signature on a first message using the first private key, and send the signed first message to the IoT device; and
   the IoT device is further configured to: receive the signed first message sent by the hub device, and perform identity authentication on the first message using the first public key.

6. The system according to claim 4, wherein
   the IoT device is further configured to: sign a second digital signature on a second message using the second private key, and send the signed second message to the hub device; and
   the hub device is further configured to: receive the signed second message sent by the IoT device, and perform identity authentication on the second message using the second public key.

7. The system according to claim 4, wherein
   the terminal is further configured to: sign a third digital signature on a third message using the first private key, and send the signed third message to the hub device; and
   the hub device is further configured to: receive the signed third message sent by the terminal, and perform identity authentication on the signed third message using the first public key.

8. The system according to claim 7, wherein
   the terminal is further configured to: obtain first device information of the IoT device, wherein the first device information comprises a personal identification number (PIN) code of the IoT device; negotiate a first shared key with the IoT device based on the first device information; and encrypt the first public key using the first shared key, and send the encrypted first public key to the IoT device; and
   the IoT device is further configured to: encrypt the second public key using the first shared key, and send the encrypted second public key to the terminal.

9. The system according to claim 8, wherein
   the terminal is further configured to: obtain second device information of the hub device, wherein the second device information comprises a PIN code of the hub device; and negotiate a second shared key with the hub device based on the second device information; and the terminal is configured to:
encrypt the first key information using the second shared key, and send the encrypted first key information to the hub device.

10. The system according to claim 9, wherein the terminal is configured to:
perform simple password exponential key exchange (SPEKE) negotiation with the IoT device based on the first device information, to obtain the first shared key, or
perform SPEKE negotiation with the hub device based on the second device information; to obtain the second shared key.

11. The system according to claim 10, wherein the terminal is configured to:
obtain the first device information of the IoT device by scanning a QR code on the IoT device, or
obtain the second device information of the hub device by scanning a QR code on the hub device.

12. The system according to claim 11, wherein
the terminal is further configured to send a management policy of the IOT device to the hub device, wherein the management policy is used to indicate that the IoT device performs a first operation when a first trigger condition is met; and
the hub device is further configured to:
receive the management policy of the IoT device by the terminal; and
when the first trigger condition is met, send a control instruction corresponding to the first operation to the IoT device.

13. The system according to claim 12, wherein the terminal is further configured to:
negotiate a third shared key with the hub device,
encrypt the management policy of the IoT device using the third shared key, and
send the encrypted management policy to the hub device.

14. The system according to claim 12, wherein the hub device is further configured to:
negotiate a fourth shared key with the IoT device based on the first key information,
encrypt, using the fourth shared key, the control instruction corresponding to the first operation, and
send the encrypted control instruction to the IoT device.

15. The system according to of claim 14, wherein the terminal is further configured to receive the management policy that is set by a user for the IoT device in a preset application.

16. The system according to claim 4, wherein the hub device is an electronic device that does not have a display function.

17. A method for synchronizing key information, comprising:
sending, by a terminal, a first public key of the terminal to an internet of things (IOT) device;
obtaining, by the terminal, a second public key of the IoT device from the IoT device;
sending, by the terminal, first key information to a hub device, wherein the first key information comprises a first private key of the terminal, the first public key, and the second public key, so that the hub device performs encrypted interaction with the IoT device using the first key information.

18. The method according to claim 17, wherein before sending the first public key of the terminal to the IoT device, the method further comprises:

obtaining, by the terminal, first device information of the IoT device, wherein the first device information comprises a personal identification number (PIN) code of the IoT device; and
negotiating, by the terminal, a first shared key with the IoT device based on the first device information,
wherein the sending the first public key of the terminal to the IoT device comprises:
encrypting, by the terminal, the first public key using the first shared key, and sending the encrypted first public key to the IoT device.

19. The method according to claim 17, wherein before sending the first key information to the hub device, the method further comprises:
obtaining, by the terminal, second device information of the hub device, wherein the second device information comprises a PIN code of the hub device; and
negotiating, by the terminal, a second shared key with the hub device based on the second device information,
wherein sending the first key information to the hub device comprises:
encrypting, by the terminal, the first key information using the second shared key, and sending the encrypted first key information to the hub device.

20. The method according to claim 19, wherein after sending the first key information to the hub device, the method further comprises:
sending, by the terminal, a management policy of the IoT device to the hub device, wherein the management policy is used to indicate that the IoT device performs a first operation when a first trigger condition is met.

21. The method according to claim 20, wherein before sending the management policy of the IoT device to the hub device, the method further comprises:
negotiating, by the terminal, a third shared key with the hub device based on the first key information,
wherein sending the management policy of the IoT device to the hub device comprises:
encrypting, by the terminal, the management policy of the IoT device using the third shared key, and sending the encrypted management policy to the hub device.

22. A method for synchronizing key information, comprising:
receiving, by a hub device, first key information sent by a terminal, wherein the first key information comprises a first private key of the terminal, a first public key of the terminal, and a second public key of an internet of things (IOT) device;
determining, by the hub device, that the first private key and the first public key are a key pair of the hub device; and
performing, by the hub device, encrypted interaction with the IoT device based on the first key information.

23. The method according to claim 22, wherein after determining that the first private key and the first public key are a key pair of the hub device, the method further comprises:
performing, by the hub device, encrypted interaction with the terminal using the first private key and the first public key.

24. The method according to claim 23, wherein after receiving the first key information sent by a terminal, the method further comprises:
obtaining, by the hub device, a management policy of the IoT device from the terminal, wherein the management policy is used to indicate that the IoT device performs a first operation when a first trigger condition is met; and when the first trigger condition is met, sending, by the hub device to the IoT device, a control instruction corresponding to the first operation.

25. The method according to claim 24, wherein obtaining the management policy of the IoT device from the terminal comprises:

negotiating, by the hub device, a third shared key with the terminal using the first key information;

obtaining, by the hub device, the encrypted management policy of the IoT device from the terminal; and decrypting, by the hub device, the management policy of the IoT device using the third shared key.

26. The method according to claim 24, wherein sending, to the IoT device, the control instruction corresponding to the first operation comprises:

negotiating, by the hub device, a fourth shared key with the IoT device using the first key information;

encrypting, by the hub device using the fourth shared key, the control instruction corresponding to the first operation; and sending the encrypted control instruction to the IoT device.

* * * * *